US012183977B2

(12) United States Patent
Jeong et al.

(10) Patent No.: US 12,183,977 B2
(45) Date of Patent: *Dec. 31, 2024

(54) ANTENNA MODULE AND ELECTRONIC DEVICE INCLUDING SAME

(71) Applicant: Samsung Electronics Co., Ltd., Suwon-si (KR)

(72) Inventors: Jungi Jeong, Suwon-si (KR); Chanju Park, Suwon-si (KR); Junhwa Oh, Suwon-si (KR); Sanghyuk Wi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/361,369

(22) Filed: Jul. 28, 2023

(65) Prior Publication Data

US 2023/0369778 A1 Nov. 16, 2023

Related U.S. Application Data

(63) Continuation of application No. 17/581,044, filed on Jan. 21, 2022, now Pat. No. 11,742,587.

(30) Foreign Application Priority Data

Feb. 2, 2021 (KR) ........................ 10-2021-0014957

(51) Int. Cl.
*H01Q 21/00* (2006.01)
*H01Q 1/22* (2006.01)
(Continued)

(52) U.S. Cl.
CPC ....... *H01Q 21/0025* (2013.01); *H01Q 1/2283* (2013.01); *H01Q 1/243* (2013.01); *H01Q 21/064* (2013.01)

(58) Field of Classification Search
CPC ........ H01Q 1/22; H01Q 1/2283; H01Q 1/243; H01Q 1/38; H01Q 21/0025;
(Continued)

(56) References Cited

U.S. PATENT DOCUMENTS 6,856,210 B2 2/2005 Zhu et al.
7,030,712 B2 * 4/2006 Brunette ............. H05K 1/0251 333/260

(Continued)

FOREIGN PATENT DOCUMENTS

KR 2011-009505 A 1/2011
KR 10-2015-0040592 A 4/2015

OTHER PUBLICATIONS

International Search Report dated May 9, 2022, issued in International Patent Application No. PCT/KR2022/001139.

(Continued)

*Primary Examiner* — Jason M Crawford
(74) *Attorney, Agent, or Firm* — Jefferson IP Law, LLP

(57) ABSTRACT

The disclosure relates to a 5th generation (5G) or 6th generation (6G) communication system for supporting a higher data transfer rate beyond 4th generation (4G) communication such as long-term evolution (LTE). An antenna module is provided. The antenna module includes a communication circuit, an antenna unit comprising multiple antenna elements constituting a subarray, and a network unit disposed beneath the antenna unit in multiple layers, the network unit comprising at least one transmission line configured to be branched to positions of the multiple antenna elements, a via hole extending through the multilayer, and a stub structure disposed on an area adjacent to the via hole. The open stub structure designed on a first layer forming a ground plane, among the multiple layers, may include a first via pad disposed to be adjacent to the via hole, a first open stub extending from the first via pad in a first (Continued)

direction, and a first slot part configured to surround the first via pad and the first open stub. The short stub structure designed on a second layer different from the first layer having the open stub structure designed thereon may include a second via pad disposed to be adjacent to the via hole, a short stub extending from the second via pad in a second direction perpendicular to the first direction, a transformer extending from the second via pad in a third direction different from the second direction so as to be connected to the at least one transmission line, and a second slot part configured to surround at least a portion of an edge of the second via pad, the short stub, and the transformer.

15 Claims, 19 Drawing Sheets

(51) Int. Cl.
*H01Q 1/24* (2006.01)
*H01Q 21/06* (2006.01)

(58) Field of Classification Search
CPC ............. H01Q 21/0043; H01Q 21/005; H01Q 21/0062; H01Q 21/0075

See application file for complete search history.

(56) References Cited

U.S. PATENT DOCUMENTS

| | | | | |
|---|---|---|---|---|
| 11,742,587 | B2 * | 8/2023 | Jeong | H01P 5/028 343/770 |
| 2006/0202312 | A1 * | 9/2006 | Iijima | H01Q 1/2283 257/664 |
| 2011/0279190 | A1 | 11/2011 | Liu et al. | |
| 2013/0342280 | A1 | 12/2013 | Blanton et al. | |
| 2014/0111393 | A1 * | 4/2014 | Lo Hine Tong | H01Q 21/28 343/770 |
| 2015/0015453 | A1 * | 1/2015 | Puzella | H05K 1/0206 333/1.1 |
| 2015/0364823 | A1 * | 12/2015 | Hashimoto | H01Q 9/0407 343/700 MS |
| 2016/0285428 | A1 | 9/2016 | Zhu et al. | |
| 2018/0084637 | A1 * | 3/2018 | Ueda | H05K 1/0219 |
| 2018/0294576 | A1 * | 10/2018 | Niakan | H01Q 1/2258 |
| 2020/0259240 | A1 * | 8/2020 | Moallem | H01Q 9/0407 |
| 2020/0344875 | A1 | 10/2020 | Sugahara et al. | |
| 2022/0159826 | A1 * | 5/2022 | Yun | H01P 3/12 |
| 2022/0247087 | A1 * | 8/2022 | Jeong | H01Q 1/2283 |
| 2022/0416428 | A1 * | 12/2022 | Zhou | H01Q 13/10 |
| 2023/0369778 | A1 * | 11/2023 | Jeong | H01P 5/028 |
| 2024/0120667 | A1 * | 4/2024 | Oh | H01Q 1/38 |

OTHER PUBLICATIONS

Extended European Search Report dated May 2, 2024, issued in European Patent Application No. 22749899.5-1201.

* cited by examiner

ANTENNA MODULE AND ELECTRONIC DEVICE INCLUDING SAME

CROSS-REFERENCE TO RELATED APPLICATION(S)

This application is a continuation application of prior application Ser. No. 17/581,044, filed on Jan. 21, 2022, which is based on and claims priority under 35 U.S.C. § 119(a) of a Korean patent application number 10-2021-0014957, filed on Feb. 2, 2021, in the Korean Intellectual Property Office, the disclosure of which is incorporated by reference herein in its entirety.

BACKGROUND

1. Field

The disclosure relates to an antenna module and an electronic device including an antenna module.

2. Description of Related Art

A review of the development of mobile communication from generation to generation shows that the development has mostly been directed to technologies for services targeting humans, such as voice-based services, multimedia services, and data services. It is expected that connected devices which are exponentially increasing after commercialization of 5th generation (5G) communication systems will be connected to communication networks. Examples of things connected to networks may include vehicles, robots, drones, home appliances, displays, smart sensors connected to various infrastructures, construction machines, and factory equipment. Mobile devices are expected to evolve in various formfactors, such as augmented reality glasses, virtual reality headsets, and hologram devices. In order to provide various services by connecting hundreds of billions of devices and things in the 6th generation (6G) era, there have been ongoing efforts to develop improved 6G communication systems. For these reasons, 6G communication systems are referred to as Beyond-5G systems.

6G communication systems, which are expected to be implemented approximately by 2030, will have a maximum transmission rate of tera (1,000 giga)-level bps and a radio latency of 100 μsec, and thus will be 50 times as fast as 5G communication systems and have the 1/10 radio latency thereof.

In order to accomplish such a high data transmission rate and an ultra-low latency, it has been considered to implement 6G communication systems in a terahertz band (for example, 95 GHz to 3 THz bands). It is expected that, due to severer path loss and atmospheric absorption in the terahertz bands than those in millimeter (mm) Wave bands introduced in 5G, a technology capable of securing the signal transmission distance (that is, coverage) will become more crucial. It is necessary to develop, as major technologies for securing the coverage, multiantenna transmission technologies including radio frequency (RF) elements, antennas, novel waveforms having a better coverage than orthogonal frequency-division multiplexing (OFDM), beamforming and massive multiple input multiple output (MIMO), full dimensional MIMO (FD-MIMO), array antennas, and large-scale antennas. In addition, there has been ongoing discussion on new technologies for improving the coverage of terahertz-band signals, such as metamaterialbased lenses and antennas, orbital angular momentum (OAM), and reconfigurable intelligent surface (RIS).

Moreover, in order to improve the frequency efficiencies and system networks, the following technologies have been developed for 6G communication systems: a full-duplex technology for enabling an uplink (user equipment (UE) transmission) and a downlink (node B transmission) to simultaneously use the same frequency resource at the same time; a network technology for utilizing satellites, high-altitude platform stations (HAPS), and the like in an integrated manner; a network structure innovation technology for supporting mobile nodes B and the like and enabling network operation optimization and automation and the like; a dynamic spectrum sharing technology though collision avoidance based on spectrum use prediction, an artificial intelligence (AI)-based communication technology for implementing system optimization by using AI from the technology design step and internalizing end-to-end AI support functions; and a next-generation distributed computing technology for implementing a service having a complexity that exceeds the limit of UE computing ability by using super-high-performance communication and computing resources (mobile edge computing (MEC), clouds, and the like). In addition, attempts have been continuously made to further enhance connectivity between devices, further optimize networks, promote software implementation of network entities, and increase the openness of wireless communication through design of new protocols to be used in 6G communication systems, development of mechanisms for implementation of hardware-based security environments and secure use of data, and development of technologies for privacy maintenance methods.

It is expected that such research and development of 6G communication systems will enable the next hyper-connected experience in new dimensions through hyper-connectivity of the 6G communication systems that covers both connections between things and connections between humans and things. Particularly, it is expected that services such as truly immersive XR, high-fidelity mobile holograms, and digital replicas could be provided through 6G communication systems. In addition, with enhanced security and reliability, services such as remote surgery, industrial automation, and emergency response will be provided through 6G communication systems, and thus these services will be applied to various fields including industrial, medical, automobile, and home appliance fields.

A communication system may include a transmit/receive (Tx/Rx) integrated circuit for generating Tx/RX signals, and an antenna element for transmitting the same as radio waves. As frequencies used by antennas increase, recent development has been directed to combining an antenna and a communication circuit (for example, radio frequency integrated circuit (RFIC)) in order to reduce Tx line loss.

The above information is presented as background information only to assist with an understanding of the disclosure. No determination has been made, and no assertion is made, as to whether any of the above might be applicable as prior art with regard to the disclosure.

SUMMARY

An antenna structure, which uses a super-high-frequency band, may be designed to have a stack of multiple substrates including antenna elements and a wireless communication circuit (for example, an RF circuit). When designing a Tx line disposed inside multiple substrates, the antenna structure may employ a strip line-type structure disposed in parallel with the substrates, and a vertical Tx via connecting between layers.

As the antenna structure uses two different types of Tx lines (for example, strip line and Tx via), discontinuity may occur between the two types of Tx lines, and loss may be increased by mismatching if the two types of Tx lines have different impedances. Accordingly, there is a need for an improved structure capable of solving this.

Aspects of the disclosure are to address at least the above-mentioned problems and/or disadvantages and to provide at least the advantages described below. Accordingly, an aspect of the disclosure is to provide an antenna module using a super-high-frequency band and employing a structure in which multiple substrates are stacked, an open stub structure and/or a short stub structure may be designed to reduce mismatching between different types of Tx lines.

Additional aspects will be set forth in part in the description which follows and, in part, will be apparent from the description, or may be learned by practice of the presented embodiments.

In accordance with an aspect of the disclosure, an antenna module is provided. The antenna module includes a communication circuit, an antenna part including multiple antenna elements constituting a subarray, and a network part disposed beneath the antenna part in multiple layers, the network part including at least one transmission line configured to be branched to positions of the multiple antenna elements, a via hole extending through the multiple layers, and a stub structure disposed in an area adjacent to the via hole. An open stub structure designed on a first layer configured to form a ground plane, among the multiple layers, may include a first via pad disposed adjacent to the via hole, a first open stub extending from the first via pad in a first direction, and a first slot part formed to surround an edge of the first via pad and the first open stub. A short stub structure designed on a second layer different from the first layer may include a second via pad disposed adjacent to the via hole, a short stub extending from the second via pad in a second direction, a transformer extending from the second via pad in a third direction different from the second direction and connected to the at least one transmission line, and a second slot part formed to surround at least a portion of an edge of the second via pad, the short stub, and the transformer.

In accordance with another aspect of the disclosure, an antenna module is provided. The antenna module includes a communication circuit, an antenna part including multiple antenna elements constituting a subarray, and a network part including multiple substrates stacked between the communication circuit and the antenna part, an open stub structure being designed on at least one layer configured to form a ground plane, among the multiple substrates. The open stub structure may include a first via pad formed along an edge of a via hole, a first open stub extending from the first via pad in a first direction, and a first slot part formed to surround an edge of the first via pad and the first open stub so as to separate the first via pad and the first open stub from the ground plane.

In accordance with another aspect of the disclosure, an antenna module is provided. The antenna module includes a communication circuit, an antenna part including multiple antenna elements constituting a subarray, and a network part including multiple substrates stacked between the communication circuit and the antenna part, a short stub structure being designed on at least one layer, among the multiple substrates, having a transmission line of a strip line disposed thereon. The short stub structure may include a first via pad formed along an edge of a via hole, a short stub extending from the first via pad in a first direction, a transformer extending from the first via pad in a second direction different from the first direction so as to be connected to the transmission line of the strip line, and a first slot part formed to surround at least a portion of an edge of the first via pad, the short stub, and the transformer.

Various embodiments of the disclosure may provide, in connection with an antenna module having multiple stacked substrates, a structure for reducing mismatching of Tx lines disposed inside the substrates or on a surface thereof.

An antenna module according to various embodiments of the disclosure may have an improved open stub structure and/or short stub structure designed in a region of a substrate, thereby implementing impedance matching between different types of Tx lines.

An antenna module according to various embodiments of the disclosure may have an improved open stub structure and/or short stub structure designed in a region of a substrate, thereby maximizing physical space availability and minimizing signal Tx line loss.

An antenna module according to various embodiments of the disclosure may be designed, in order to optimize module inside structure, such that respective layers have specified functions are have independency, thereby providing module development efficiency.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
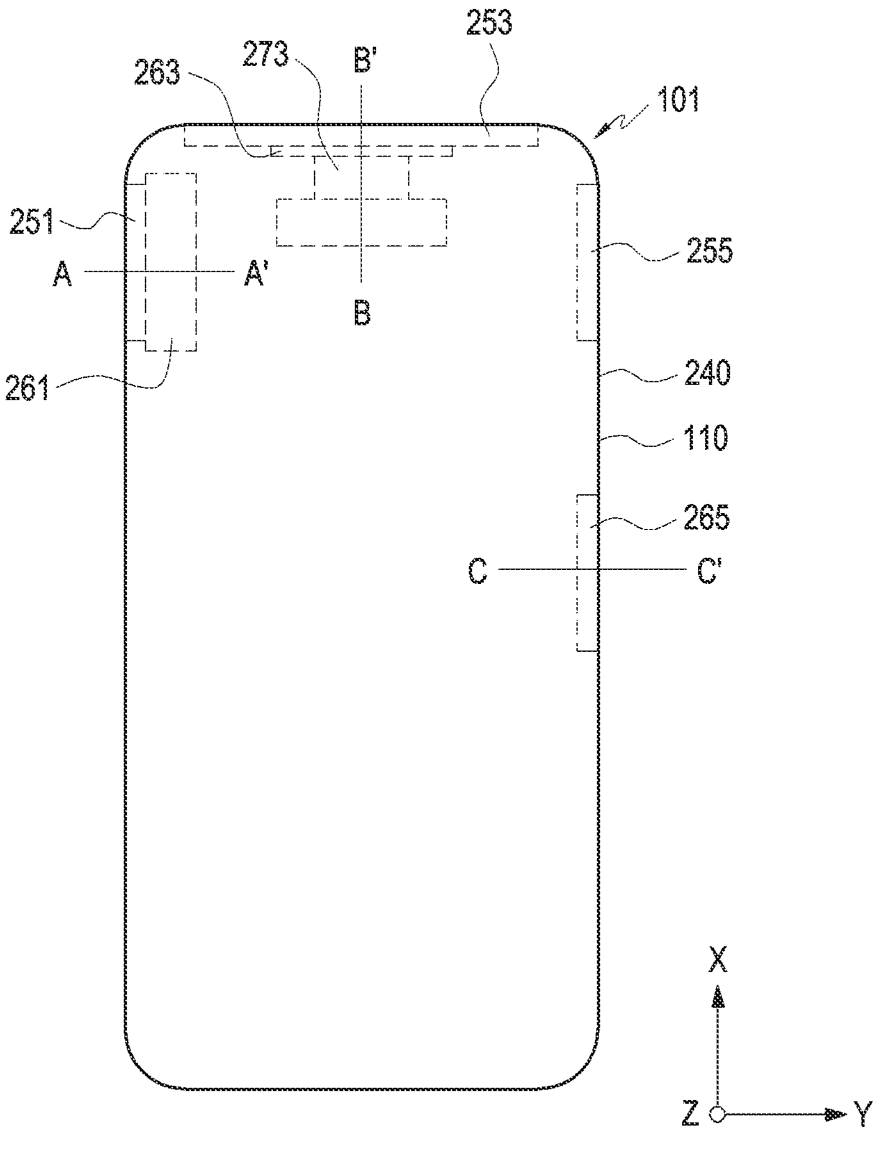
FIG. 1 shows an embodiment of a structure of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. It is to be understood that a singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Herein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

FIG. 1 is an embodiment of a structure of an electronic device according to an embodiment of the disclosure.

Figure 2:
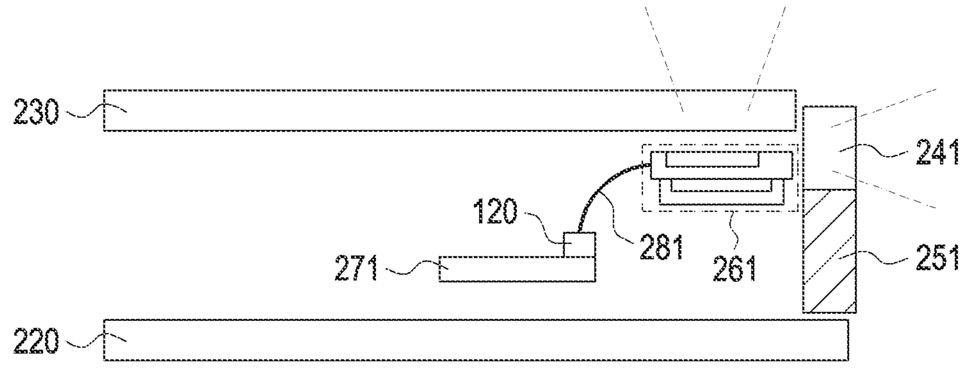
FIG. 2 is a cross-sectional view taken along axis A-A' in FIG. 1 according to an embodiment of the disclosure.

FIG. 2 is a cross-sectional view taken along axis A-A' in FIG. 1 according to an embodiment of the disclosure.

Figure 3:
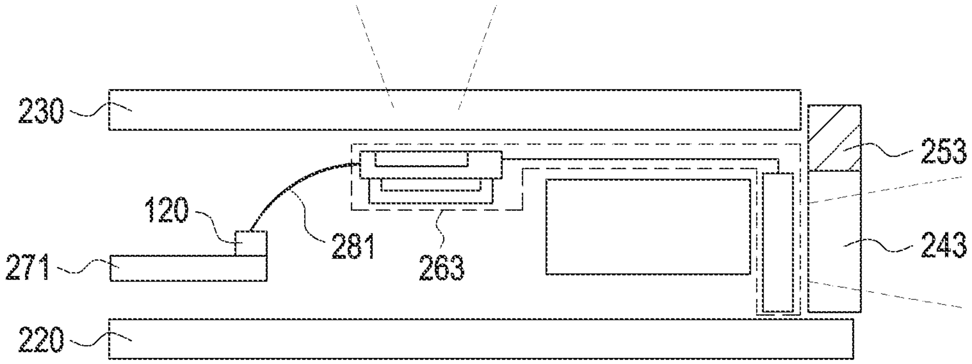
FIG. 3 is a cross-sectional view taken along axis B-B' in FIG. 1 according to an embodiment of the disclosure.

FIG. 3 is a cross-sectional view taken along axis B-B' in FIG. 1 according to an embodiment of the disclosure.

Figure 4:
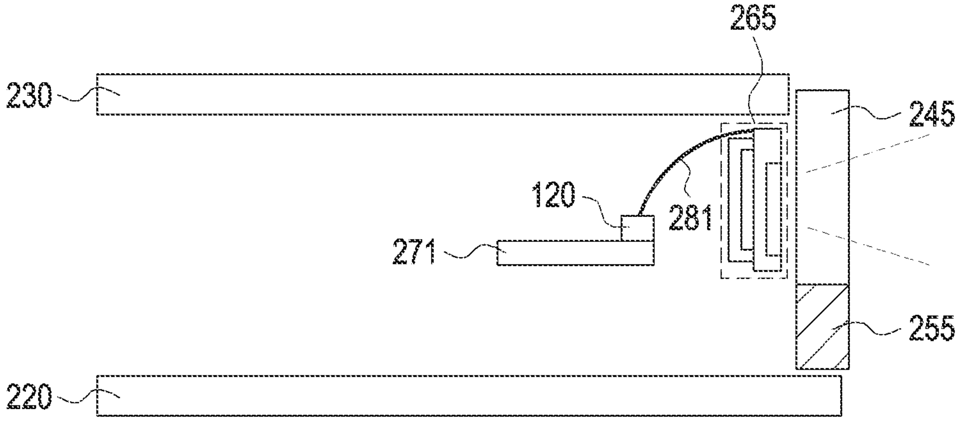
FIG. 4 is a cross-sectional view taken along axis C-C' in FIG. 1 according to an embodiment of the disclosure.

FIG. 4 is a cross-sectional view taken along axis C-C' in FIG. 1 according to an embodiment of the disclosure.

Referring to FIGS. 1 to 4, an electronic device 101 may include a housing 110 including a first plate 220 (for example, front plate), a second plate 230 spaced apart from the first plate 220 and facing a direction opposite to the first plate (for example, rear plate or rear glass), and a lateral member 240 surrounding a space between the first plate 220 and the second plate 230.

According to an embodiment, the first plate 220 may include a transparent material including a glass plate. The second plate 230 may include a non-conductive and/or conductive material. The lateral member 240 may include a conductive material and/or a non-conductive material. In an embodiment, at least a portion of the lateral member 240 may be integrally formed with the second plate 230. In an embodiment, the lateral member 240 may include first to third insulation units 241, 243, and 245 and/or first to third conduction units 251, 253, and 255. In another embodiment, the lateral member 240 may omit one of first to third insulation units 241, 243, and 245 and/or first to third conduction units 251, 253, and 255. For example, when the first to third insulation units 241, 243, and 245 are omitted, the portions corresponding to the first to third insulation units 241, 243, and 245 may be formed of conduction units. For another example, when the first to third conduction units 251, 253, and 255 are omitted, the portions corresponding to the first to third insulation units 251, 253, and 255 may be formed of insulation units.

According to an embodiment, the electronic device 101 may include a display shown through the first plate 220, a main printed circuit board (PCB) 271, and/or a mid-plate (not shown) in the space, and may selectively include other components in addition thereto.

According to an embodiment, the electronic device 101 may include a first antenna (for example, first conduction unit 251), a second antenna (for example, second conduction unit 253), or a third antenna (for example, third conduction unit 255) in the space and/or in a portion (for example, lateral member 240) of the housing 110. For example, the first to third antennas may function as antenna radiators supporting, for example, cellular communication (for example, second generation (2G), third generation (3G), fourth generation (4G), or long term evolution (LTE)), near field communication (for example, Wi-Fi, Bluetooth, or NFC), and/or a global navigation satellite system (GNSS).

According to an embodiment, the electronic device 101 may include a first antenna module 261, a second antenna module 263, and/or a third antenna module 265 for forming a directional beam. For example, the antenna modules 261, 263, and 265 may be used for 5G network communication, mmWave communication, 60 GHz communication, wireless gigabit (WiGig) communication, or 6G network communication. In an embodiment, the antenna modules 261, 263 and 265 may be disposed in the space to be spaced apart from a metal member (for example, housing 110, internal component 273, and/or first to third antennas) of the electronic device 101. In another embodiment, the antenna modules 261, 263, and 265 may be disposed in the space to be in contact with a metal member (for example, housing 110, and/or first to third conduction units 251, 253 and 255) of the electronic device 101.

Referring to FIG. 1, in an embodiment, the first antenna module 261 may be disposed at a left (−Y axis) upper end, the second antenna module 263 may be disposed at an upper (X axis) middle end, and the third antenna module 265 may be disposed at a right (Y axis) middle. In another embodiment, the electronic device 101 may include additional antenna modules at additional positions (for example, lower (−X axis) middle) or a portion of the first to third antenna modules 261, 263 and 265 may be omitted. According to an embodiment, the first to third antenna modules 261, 263 and 265 may be electrically connected to at least one communication processor 120 disposed on a PCB 271 by using a conductive line 281 (for example, coaxial cable or flexible PCB (FPCB)).

Referring to FIG. 2 illustrating a cross-sectional view taken along axis A-A' in FIG. 1, in the first antenna module 261 including a first antenna array (not shown) or a second antenna array (not shown), the first antenna array may be disposed to perform radiation toward the second plate 230 direction and the second antenna array may be disposed to perform radiation through the first insulation unit 241.

Referring to FIG. 3 illustrating a cross-sectional view taken along axis B-B' in FIG. 1, a first antenna array of the second antenna module 263 may be disposed to perform radiation toward the second plate 230 direction and a second antenna array thereof may be disposed to perform radiation through the second insulation unit 243. In an embodiment, the first antenna array or the second antenna array may include a dipole antenna, a patch antenna, a monopole antenna, a slot antenna, or a loop antenna.

In an embodiment, the second antenna module 263 may include a first printed circuit board and a second printed circuit board electrically connected to the first printed circuit board. A first antenna array may be disposed on the first printed circuit board. A second antenna array may be disposed on the second printed circuit board. According to an embodiment, the first printed circuit board and the second printed circuit board may be connected through a flexible circuit board or a coaxial cable. The flexible circuit board and the coaxial cable may be disposed around an electric component (for example, receiver, speaker, sensors, camera, ear jack, or button).

Referring to FIG. 4 illustrating a cross-sectional view taken along axis C-C' in FIG. 1, the third antenna module 265 may be disposed to perform radiation toward the lateral member 240 of the housing 110. For example, an antenna array of the third antenna module 265 may be disposed to perform radiation through the third insulation unit 245.

Figure 5:
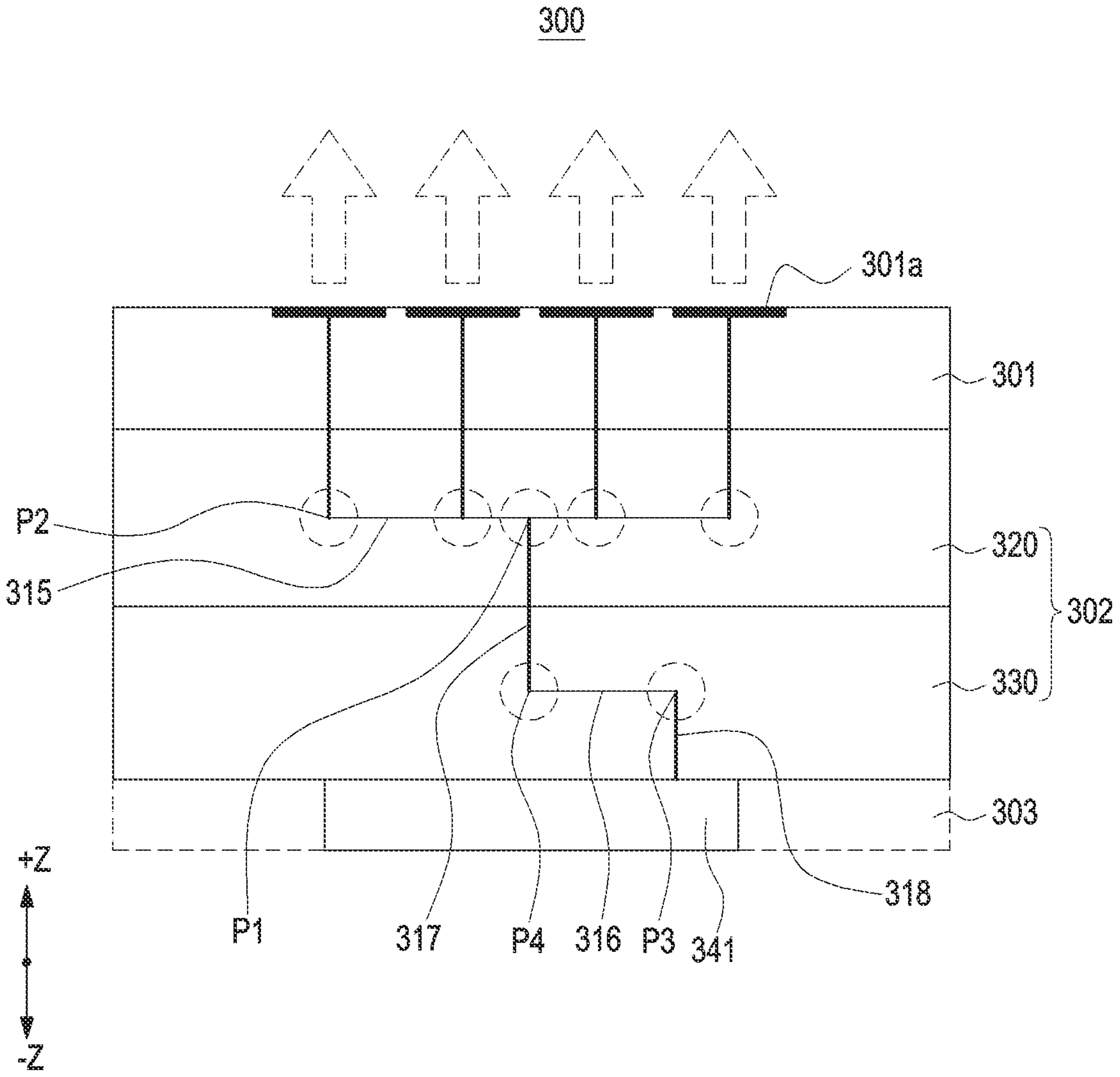
FIG. 5 is a cross-sectional view of an antenna module disposed in an electronic device according to an embodiment of the disclosure.

FIG. 5 is a cross-sectional view of an antenna module disposed in an electronic device according to an embodiment of the disclosure.

According to various embodiments, an electronic device (for example, electronic device 101 in FIGS. 1 to 4) may include an antenna module 300.

Referring to FIG. 5, the antenna module 300 may have an antenna in package structure applicable to an ultrahigh frequency and an antenna disposed on the antenna module 300 may form a subarray (for example, subarray structure). According to an embodiment, groups (hereinafter, referred to as antenna unit 301, network unit 302, and communication circuit unit 303) of respective layers constituting the antenna module 300 are designed to have independence from each other so as to minimize line loss and improve space efficiency through optimizing an internal structure of the module.

According to various embodiments, the antenna module 300 may include an antenna unit 301 in which antenna elements 301*a* (for example, conductive plate) form a specified array and which is composed of multiple layers. In antenna module 300, a network unit 302 and a communication circuit unit 303 are stacked-up in a downward direction with reference to the antenna unit 301. According to an embodiment, the network unit 302 may include a feeding network unit 320 and a routing unit 330.

According to various embodiments, the antenna module 300 may be designed to have a high density interconnect (HDI) PCB structure composed of multiple layers. For example, the antenna unit 301, the feeding network unit 320, the routing unit 330, and the communication circuit unit 303 each may be formed by stacking-up multiple layers.

According to various embodiments, the antenna unit 301 may be designed to have a subarray structure including a specified arrangement (for example, subarray) of antenna elements 301*a*. The antenna elements 301*a* may be antenna radiators and may include, for example, a patch-type radiation conductor or a conductive plate type having a dipole structure extending in one direction. For another example, the patch-type antenna elements 301a may efficiently use a physical space of the antenna module 300 and provide a broadside radiation pattern and thus may be advantageous in a gain and beam steering.

According to various embodiments, the antenna unit 301 may be designed to have a subarray structure in which main radiators (for example, antenna elements 301*a*) connected to power supply lines of the feeding network unit 320 are arranged on one surface of or in a first layer including a surface exposed to the outside. In the subarray structure, the number of radiators deployable in the antenna module 300 is determined according to a frequency band used therefor, the subarray structure may be variously designed to correspond to the determined number of the radiators. For example, the subarray structure may be variously arranged such as in an array of 2×1, 2×2, 4×1, or 4×2, based on the patch type. For another example, a shape of the patch type may be one of various shapes such as a square, circle, rectangle, or oval. According to another embodiment, the arrangement and shape of the subarray structure may be determined according to requirements of the half power beamwidth and beam scan range.

According to various embodiments, the network unit 302 may be disposed beneath the antenna unit 301 and formed of multiple layers. The network unit 302 may electrically connect a transmission signal and/or a reception signal transferred from the communication circuit (for example, RFIC) 341 to the antenna elements 301*a* of the antenna unit 301. According to an embodiment, in the network unit 302, the feeding network unit 320 adjacent to the antenna unit 301 and the routing unit 330 adjacent to the communication circuit unit 303 may be stacked on each other. An antenna module for an ultrahigh frequency causes an increase in degree of integration of transmission lines due to insufficiency of physical spaces, and for designing with accordance to this, the network unit 302 may be designed to have two separate stacked groups (each group is composed of multiple layers). For example, the optimal path for minimum loss and maximum efficiency may be designed by separating functions of groups such that one group is used as the feeding network unit 320 and the other group is used as the routing unit 330, checking the spatial topology analyzed in consideration of a transmission signal supplied by the communication circuit 341 and/or a position of a reception transmission line (for example, bump map) and a feeding position of antenna elements forming a subarray structure, and optimizing the adjacency and connectivity between each layer.

According to various embodiments, the feeding network unit 320 of the network unit 302 may be formed of multiple layers and may transfer a signal transferred from the communication circuit 341 to the antenna elements 301*a* (or feeding lines connected to the antenna elements 301*a*) of the antenna unit 301 by using a first transmission line 315 having a power splitter form. When each of the antenna elements 301*a* forming the subarray structure is supplied with the same power and phase value, the antenna elements may maximize the performance thereof, and to this end, the first transmission line 315 of the feeding network unit 320 may be variously designed.

According to an embodiment, the first transmission line 315 of the feeding network unit 320 may form a strip type transmission line branched from a first point P1 connected to the routing unit 330 as a starting point into multiple second points P2 facing positions of multiple first antenna elements, respectively. The first point P1 of the first transmission line 315 and at least one of second points P2 may form the same transmission line. According to another embodiment, the first point P1 of the first transmission line 315 and the multiple second points P2 may be arranged on the same layer or on different layers.

According to various embodiments, the routing unit 330 of the network unit 302 may be formed of multiple layers and may electrically connect an output position of the communication circuit 341 to an input position of the feeding network unit 320. For example, the routing unit 330 may include a strip type second transmission line 316 and a second via 318 to supply a signal provided from the communication circuit 341 to the feeding network unit 320 via the routing unit 330. The second transmission line 316 of the routing unit 330 may extend from a third point P3 connected to the first via 317 of the communication circuit unit 303 as a starting point toward a fourth point P4 facing the first point P1 of the feeding network unit 320 on one layer. According to an embodiment, the second via 318 of the routing unit 330 may be a through-via for signal flow and may connect the first point of the feeding network unit 320 and the fourth point of the routing unit 330.

According to an embodiment, the position of the communication circuit 341 positioned on the lower surface of the antenna module 300 and the position of the antenna elements 301*a* of the subarray structure positioned on the upper surface thereof may have fixed values, and the output position (for example, second point P2) of the first transmission line 315 of the feeding network unit 320 connected to the antenna elements 301*a* may have a fixed value. The feeding network unit 320 may be formed to be transmission line in a power splitter form, and thus the routing unit 330 may be formed to have an optimal path connecting two points in consideration of an input position (for example, first point P1) of the first transmission line 315 of the feeding network unit 320 and an output position (for example, position of Tx terminal/Rx terminal of communication circuit 341) of the communication circuit 341.

According to various embodiments, the communication circuit unit 303 may be positioned beneath the network unit 302 and include the communication circuit 341. The communication circuit unit 303 may include multiple first vias 317 to supply a transmission and/or reception output of the communication circuit 341 to the routing unit 330, and each of the multiple first vias 317 may be designed to pass through multiple conduction layers (and dielectric layers). According to an embodiment, the communication circuit unit 303 may include a via (for example, first via 317) without a transmission line.

According to an embodiment, the communication circuit unit 303 may include an RF signal lines for transmitting and/or receiving an RF signal of the communication circuit 341, inputting and outputting an intermediate frequency (IF) signal used in the communication circuit 341, inputting and outputting of a logic circuit, a control signal, and power/ground lines. The thickness of the communication circuit unit 303 may be designed to correspond to the number of input and output signals of the communication circuit 341.

Figure 6:
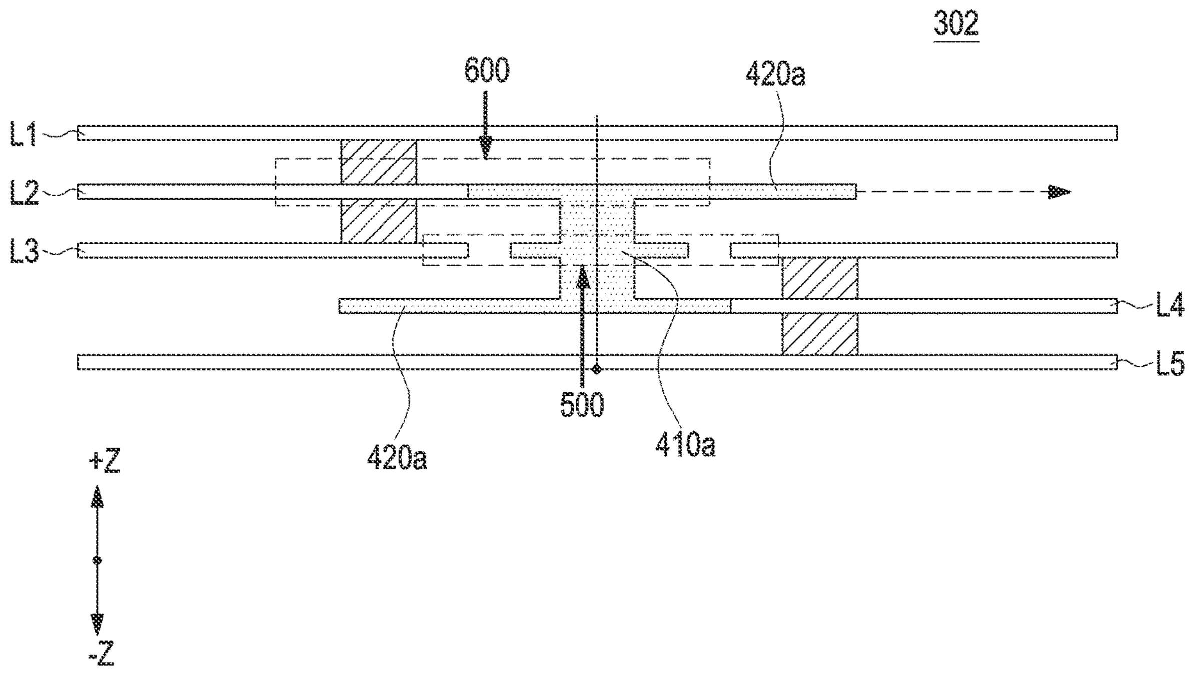
FIG. 6 is a cross-sectional view illustrating a matching structure between transmission lines in a network unit of an antenna module according to an embodiment of the disclosure.

FIG. 6 is a cross-sectional view illustrating a matching structure between transmission lines in a network unit of an antenna module according to an embodiment of the disclosure.

Referring to FIG. 6, according to various embodiments, an electronic device (for example, electronic device 101 in FIGS. 1 to 4) may include an antenna module (for example, antenna module 300 in FIG. 5). The antenna module 300 may have an antenna in package structure applicable to an ultrahigh frequency and an antenna disposed on the antenna module 300 may form a subarray. Respective groups of layers constituting the antenna module 300 are designed to have independence from each other so as to minimize line loss and improve space efficiency through optimizing an internal structure of the module.

The configuration of a network unit 302 of the antenna module in FIG. 6 may be entirely or partially identical to that of the network unit 302 of the antenna module in FIG. 5.

According to various embodiments, the network unit 302 of the antenna module 300 may include a feeding network unit 320 and a routing unit 330 stacking on each other. The feeding network unit 320 and/or the routing unit 330 may have a structure in which multiple circuit boards are stacked on each other, and at least a portion of the multiple circuit boards may include transmission lines for transmitting and/or receiving a signal.

According to various embodiments, the transmission lines may be designed to be disposed on and/or in the circuit board and may include transmission lines extending in the horizontal direction and extending in the vertical direction to pass through multiple circuit boards. For example, the horizontally extending transmission lines may be strip type lines and the vertically extending transmission lines may be vias. According to an embodiment, in order to reduce loss which may be caused by mismatching impedance which may be generated between the horizontal transmission lines (hereinafter, referred to as transmission line of strip line) and the vertical transmission lines (hereinafter, referred to as transmission via), the antenna module 300 may be designed to have an open stub structure 500 and/or a short stub structure 600 adjacent to the transmission lines.

According to various embodiments, the open stub structure 500 and/or the short stub structure 600 may be designed in a feeding network unit 320 and/or a routing unit 330. For example, referring to FIG. 5, like an area circled by the dotted line, the open stub structure 500 and/or the short stub structure 600 may be designed in a section in which the horizontal transmission lines and the vertical transmission lines are positioned.

According to various embodiments, in the stacked circuit boards constituting the feeding network unit 320 and/or the routing unit 330, a second layer L2, a third layer L3, a fourth layer L4, and a fifth layer L5 may be sequentially arranged along −Z axis direction with reference to a first layer L1 disposed on the top. The open stub structure 500 and/or the short stub structure 600 may be disposed adjacent to a via 410*a* extending through the circuit board. According to an embodiment, the via 410, as one type of transmission lines for supplying a signal (for example, transmission via), may pass through the second layer L2, the third layer L3, and the fourth layer L4 and may be electrically connected to a strip line 420*a* disposed on the second layer L2 and the fourth layer L4. According to an embodiment, the open stub structure 500 may be disposed on the same layer as the third layer L3 forming a ground plane. The open stub structure 500 may be designed to include a via pad, an open stub, and a slot part. According to an embodiment, the short stub structure 600 may be formed on the same layer as the second layer L2 and/or the fourth layer L4 on which the strip line 420 is disposed. The short stub structure 600 may be designed to include a via pad, a short stub, a transformer, and a slot part.

Hereinafter, the open stub structure and the short stub structure will be described in detail.

Figure 7:
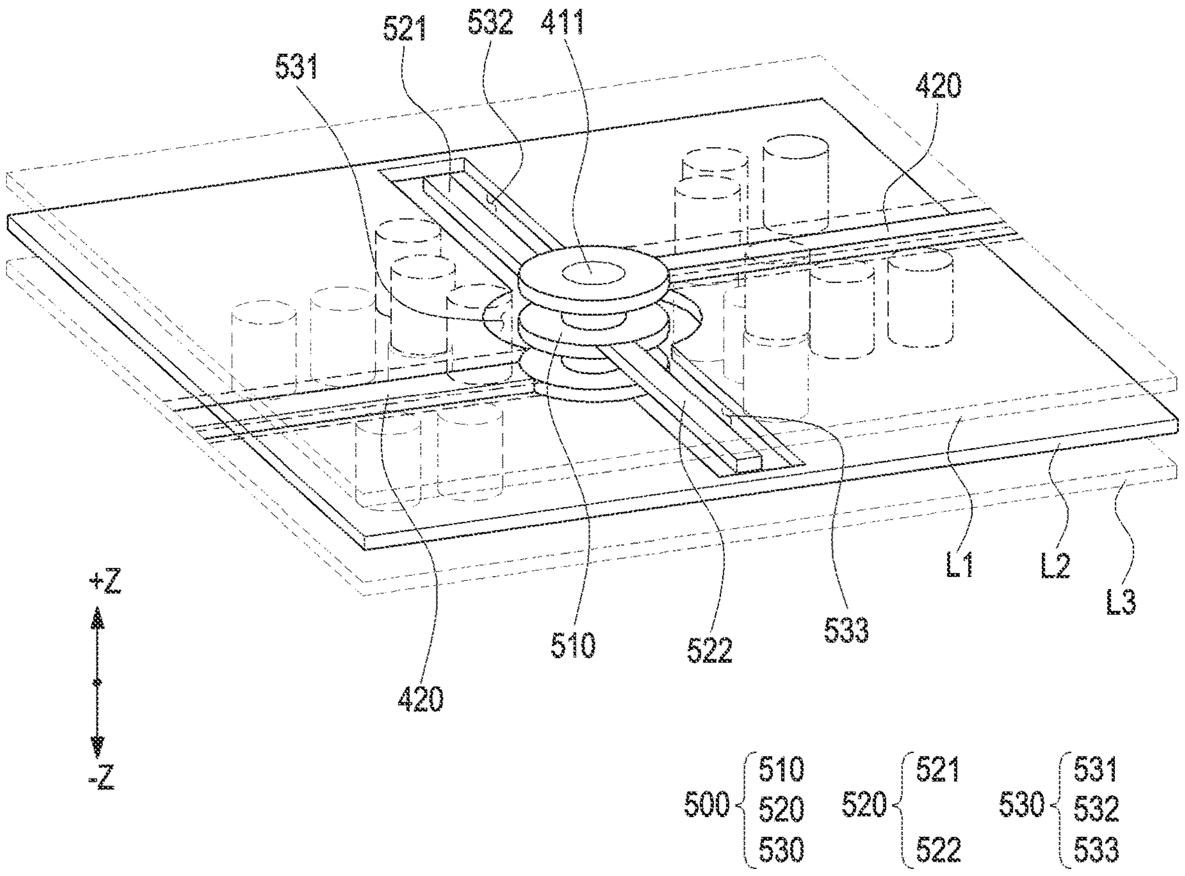
FIG. 7 is a perspective view illustrating an open stub structure designed in a network unit of an antenna module according to an embodiment of the disclosure.

FIG. 7 is a perspective view illustrating an open stub structure designed in a network unit of an antenna module according to an embodiment of the disclosure.

Figure 8:
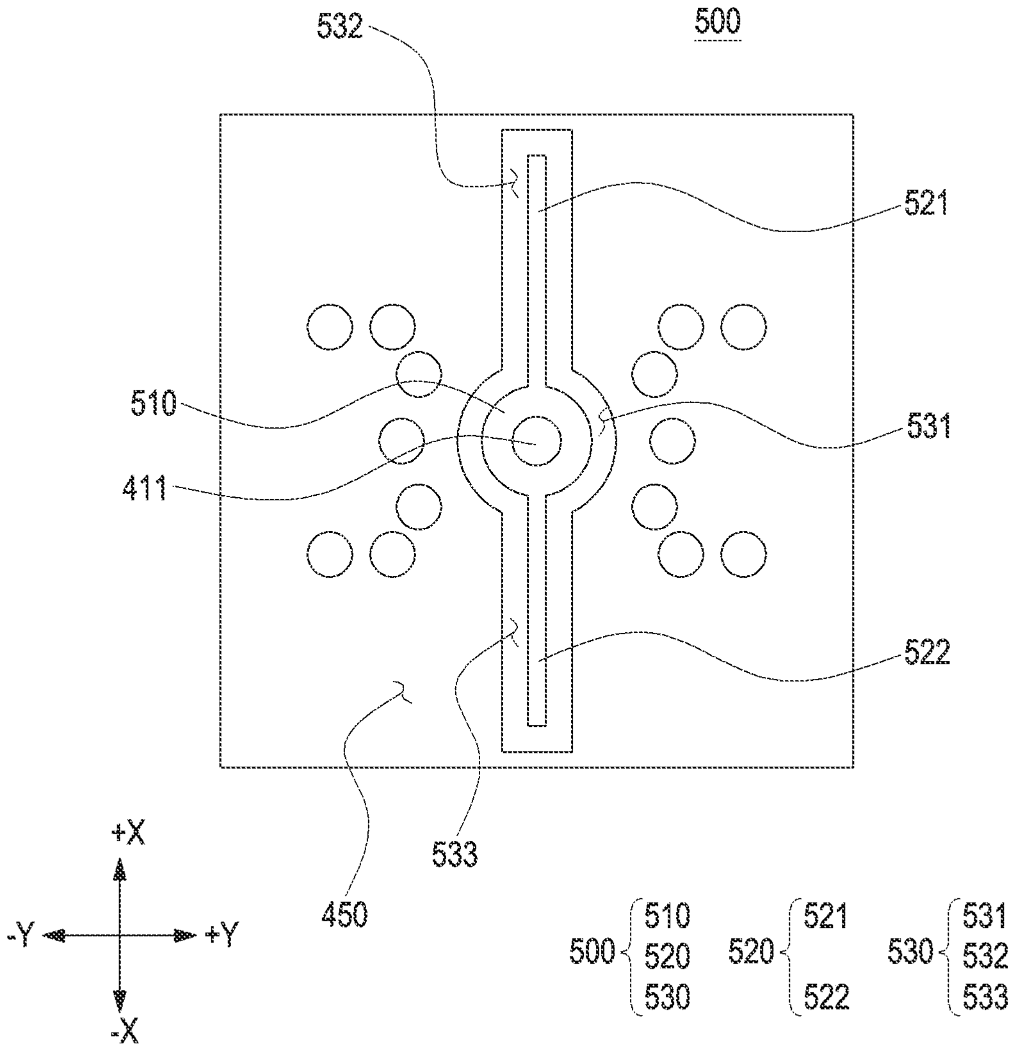
FIG. 8 is a planar view illustrating an open stub structure designed in a network unit of an antenna module according to an embodiment of the disclosure.

FIG. 8 is a planar view illustrating an open stub structure designed in a network unit of an antenna module according to an embodiment of the disclosure.

Figure 9:
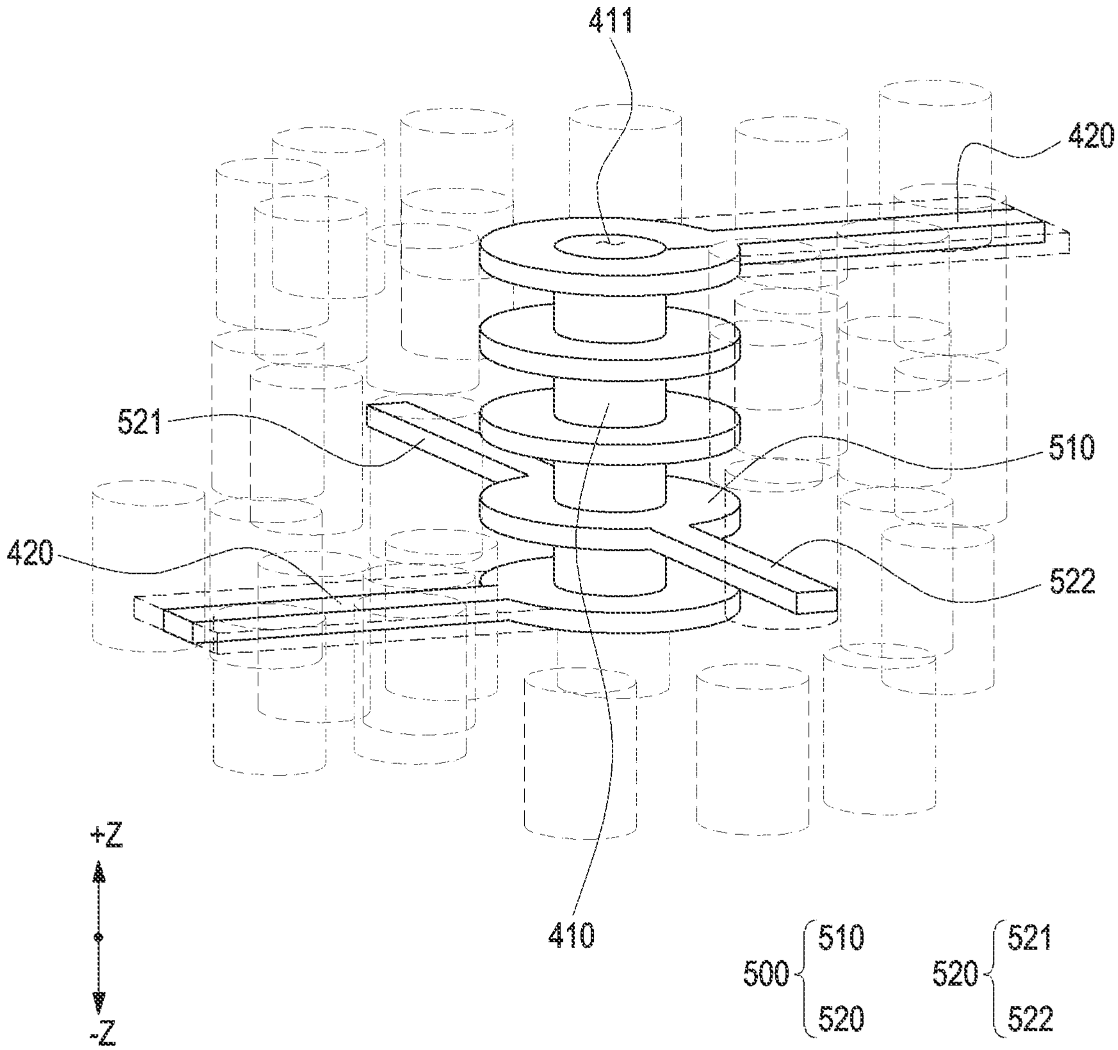
FIG. 9 is a perspective view illustrating an open stub structure designed in a network unit of an antenna module according to an embodiment of the disclosure.

FIG. 9 is a perspective view illustrating an open stub structure designed in a network unit of an antenna module according to an embodiment of the disclosure.

According to various embodiments, an electronic device (for example, electronic device 101 in FIGS. 1 to 4) may include an antenna module (for example, antenna module 300 in FIG. 5). The antenna module 300 may have an antenna in package structure applicable to an ultrahigh frequency, and an antenna disposed on the antenna module 300 may form a subarray. A network unit 302 constituting the antenna module 300 may provide an efficient matching design of transmission lines in a narrow space to provide a high frequency. Accordingly, space efficiency may be improved, and line loss may be minimized by optimizing the internal structure of the module.

The configuration of the network unit 302 of the antenna module in FIGS. 7 to 9 may be entirely or partially identical to that of the network unit 302 of the antenna module in FIGS. 5 and 6.

According to various embodiments, the network unit 302 of the antenna module 300 may include a feeding network unit 320 and a routing unit 330 stacking on each other. The feeding network unit 320 and the routing unit 330 may each include multiple layers. An open stub structure 500 may designed in one area of the feeding network unit 320 and/or the routing unit 330. Hereinafter, the open stub structure 500 designed in the routing unit 330 will be described, and the described open stub structure 500 may be equally applied to the feeding network unit 320 as well.

Referring to FIG. 7 according to an embodiment, the routing unit 330 may include a second layer L2 and a third layer L3 in −Z axis direction with reference to a first layer L1 stacked adjacent to the feeding network unit 320. The open stub structure 500 may be designed on one layer of the routing unit 330, and the open stub structure 500 may improve impedance matching performance between transmission lines (for example, strip line 420*a* and via 410*a* in FIG. 6) in a narrow space. According to an embodiment, a transmission lines 420 of a strip line may be designed on the first layer L1 and the third layer L3, and the second layer L2 interposed between the first layer L1 and the third layer L3 may form a ground plane. The open stub structure 500 may be designed on the ground plane which is the second layer L2, and may use a space relatively spacious compared to the first layer L1 and the third layer L3.

Referring to FIG. 9 according to an embodiment, disclosed is a structure in which more substrates are stacked compared to the structure of a stacked circuit boards in FIG. 7. The routing unit 330 may include the second layer, the third layer, the fourth layer, and the fifth layer in −Z axis direction with reference to the first layer stacked adjacent to the feeding network unit 320 and the open stub structure 500 may be designed on one layer including a ground plane. According to an embodiment, the transmission via 410 may pass through a total of five layers of stacked substrates, the open stub structure 500 may be designed on the ground plane, the fourth layer, and the transmission line 420 of the strip line may be designed on the first layer and the fifth layer. According to an embodiment, the open stub structure 500 may be designed on a different surface other than the ground plane.

Hereinafter, the description will be made with reference to the open stub structure 500 in FIG. 7.

According to various embodiments, the open stub structure 500 may be designed adjacent to a portion (for example, second layer) of the transmission via 410 extending through the first layer L1, the second layer L2, and the third layer L3. For example, the open stub structure 500 may include a first via pad 510 disposed adjacent to a via hole 411, an open stub 520 extending from the first via pad 510, and slot part 530. For another example, the open stub structure 500 may be designed to include an opening formed through an area of the second layer L2 forming the ground plane 450, the open stub 520 formed in an area of the via pad 510 and extending along the opening.

According to an embodiment, the first via pad 510 may be formed to surround the periphery of the via hole 411. For example, the first via pad 510 may be supplied in a closed loop shape, and at least a portion of the slot part 530 may be designed along the periphery of the first via pad 510. The open stub 520 may be an area extending from the first via pad 510 and may include a first open stub 521 extending toward a first direction (+X axis direction) and a second open stub 522 extending toward a second direction (−X axis direction) opposite to the first direction. The first open stub 521 and the second open stub 522 may include a conductive material and may be designed in a bar shape parallel to the ground plane 450 of the second layer L2. It is possible to provide a stable attribute by designing the first open stub 521 and the second open stub 522 to have the same length in shapes corresponding to each other. However, the illustrated embodiment amounts to one structure and the open stub may be designed and changed in various shapes other than the bar shape in consideration of space and performance.

According to an embodiment, the first open stub 521 and the second open stub 522 may be formed to have a thickness of about 0.02 mm to 0.06 mm. For example, the first open stub 521 and the second open stub 522 may be formed to have a thickness of about 0.04 mm According to another embodiment, the first open stub 521 and the second open stub 521 each formed on the second layer L2 may be arranged in a direction perpendicular to a direction (third direction (+Y axis direction or −Y axis direction)) in which the strip line 420 formed on the first layer L1 and/or the third layer L3 is disposed.

According to an embodiment, the slot part 530 of the open stub structure 500 may be formed to surround at least a portion of the first and second open stubs 521 and 522 and the via pad 510. For example, the slot part 530 may include a first slot part 531 formed in a closed loop shape to surround the via pad 510 provided in a ring shape, a second slot part 532 connected to the first slot part 531 and formed to surround the first open stub 521, and a third slot part 533 connected to the first slot part 531 and formed to surround the second open stub 522. For another example, the slot part 530 may include a first slot part 531 provided in a shape corresponding to the via pad 510 and separating the via pad 510 from the ground plane, a second slot part 532 connected to the first slot part 531 and formed along an end and opposite lateral surfaces of the first open stub 521, and a third slot part 533 connected to the first slot part 531 and formed along an end and opposite lateral surfaces of the second open stub 522. For another example, when viewed from above the second layer L2, the via pad 510 and the first open stub 521 and the second open stub 522 each extending from the via pad 510 may be designed in a shape of an island floating in a space by the slot part 530.

Figure 10:
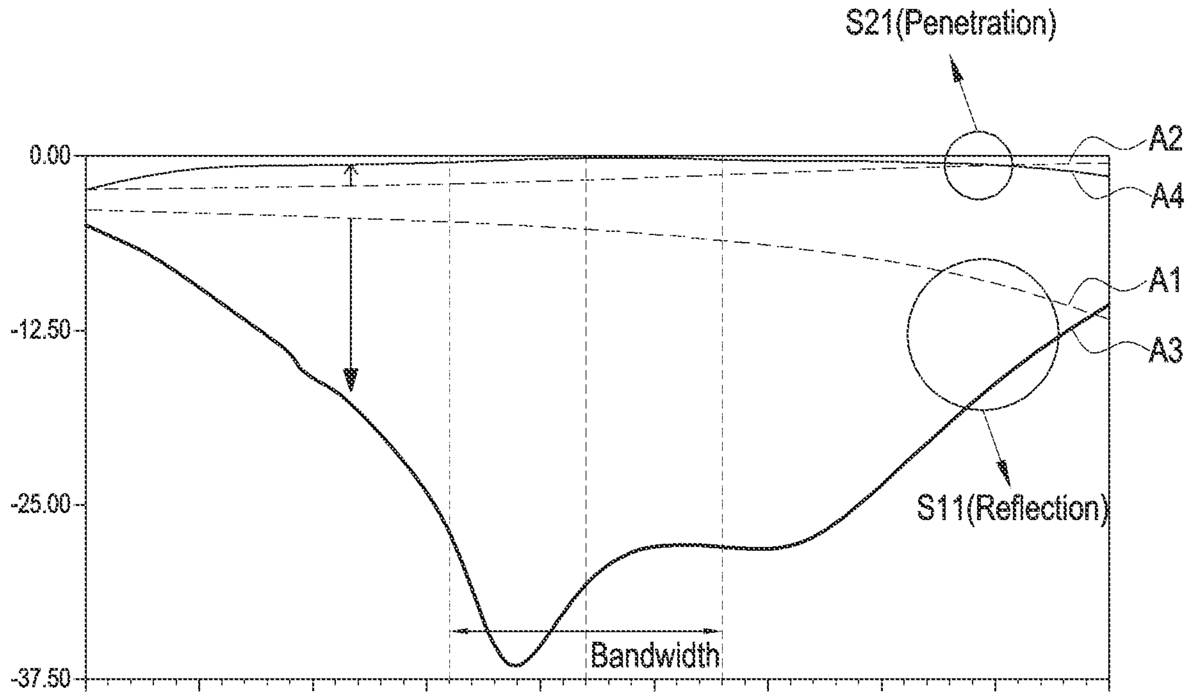
FIG. 10 is a graph depicting comparison between an attribute of a transmission line when an open stub structure is designed in a routing unit and an attribute of a transmission line when the open stub structure is excluded from a routing unit of an antenna module according to an embodiment of the disclosure.

FIG. 10 is a graph depicting comparison between an attribute of a transmission line when an open stub structure is designed in a routing unit and an attribute of a transmission line when an open stub structure is excluded from a routing unit of an antenna module according to an embodiment of the disclosure.

The open stub structure 500 of the antenna module, defined in the graph in FIG. 10, may be partially or entirely identical to the open stub structure 500 in FIGS. 7 and 8.

According to various embodiments, it is possible to assume that, in network unit of the antenna module, in which multiple circuit boards are stacked, a transmission line of a strip line for transmitting a signal through a via may be disposed on an upper layer and/or lower layer with reference to a layer forming a ground plane, and the open stub structure is designed on the layer forming the ground plane. It is possible to match a specific impedance corresponding to the length or thickness of the stub by applying a predetermined ideal open stub structure as an equivalent circuit and analyzing same. For example, it is possible to obtain an impedance of the via close to 50 ohms, and according to the data of the experiment result, the result of the graph in FIG. 10 may be derived.

Referring to FIG. 10, line 1 A1 and line 2 A2 (for example, dotted line) show an attribute of the transmission line when the open stub structure is absent, and line 3 A3 and line 4 D (solid line) show an attribute of the transmission line when the open stub structure is designed according to an embodiment. Line 1 A1 and line 3 A3 are S11 plots and line 2 A2 and line 4 A4 are S21 plots.

The comparison of the case of including an open stub structure (for example, line 3 A3) according to an embodiment with the case of excluding an open stub structure (for example, line 1 A1) confirmed that the case of including an open stub structure has relatively reduced reflectivity in a specific bandwidth. The comparison of the case of including an open stub structure (for example, line 4) according to an embodiment with the case of excluding an open stub structure (for example, line 2) confirmed that the case of including an open stub structure has relatively high permeability in a specific bandwidth. For example, it was confirmed that S21 attribute is improved by at least about 1 dB or more in a specific bandwidth through the open stub structure.

Figure 11A:
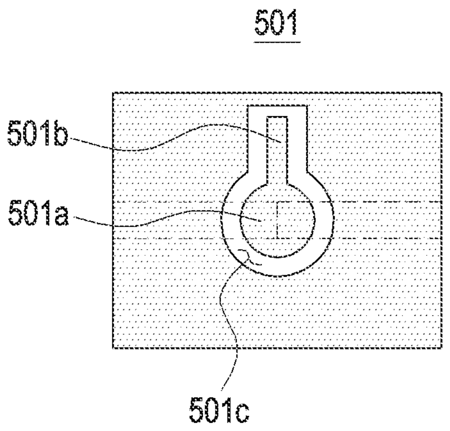
FIG. 11A is a planar view illustrating an open stub structure designed in a network unit of an antenna module according to an embodiment of the disclosure.

FIG. 11A is a planar view illustrating an open stub structure designed in a network unit of an antenna module according to an embodiment of the disclosure.

Figure 11B:
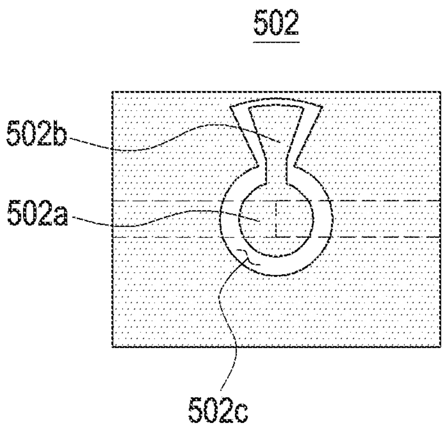
FIG. 11B is a planar view illustrating an open stub structure designed in a network unit of an antenna module according to an embodiment of the disclosure.

FIG. 11B is a planar view illustrating an open stub structure designed in a network unit of an antenna module according to an embodiment of the disclosure.

Figure 11C:
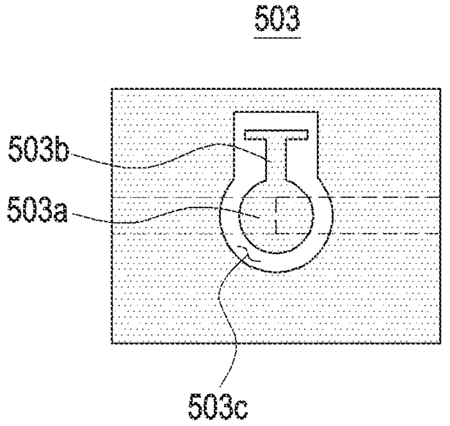
FIG. 11C is a planar view illustrating an open stub structure designed in a network unit of an antenna module according to an embodiment of the disclosure.

FIG. 11C is a planar view illustrating an open stub structure designed in a network unit of an antenna module according to an embodiment of the disclosure.

Figure 11D:
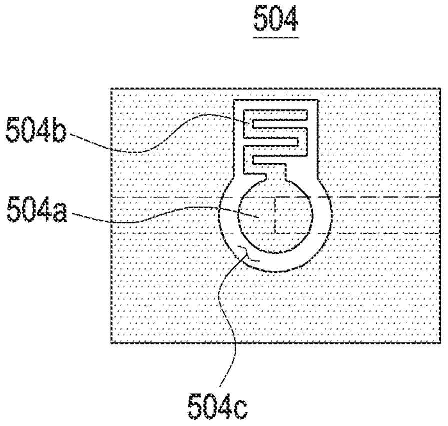
FIG. 11D is a planar view illustrating an open stub structure designed in a network unit of an antenna module according to an embodiment of the disclosure.

FIG. 11D is a planar view illustrating an open stub structure designed in a network unit of an antenna module according to an embodiment of the disclosure.

Figure 11E:
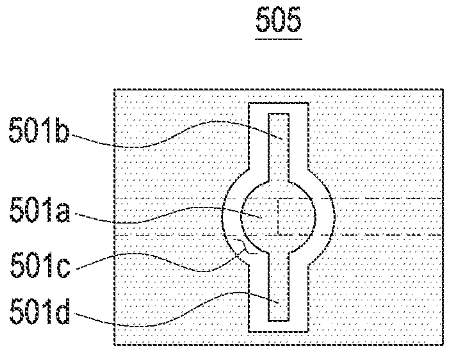
FIG. 11E is a planar view illustrating an open stub structure designed in a network unit of an antenna module according to an embodiment of the disclosure.

FIG. 11E is a planar view illustrating an open stub structure designed in a network unit of an antenna module according to an embodiment of the disclosure.

Figure 11F:
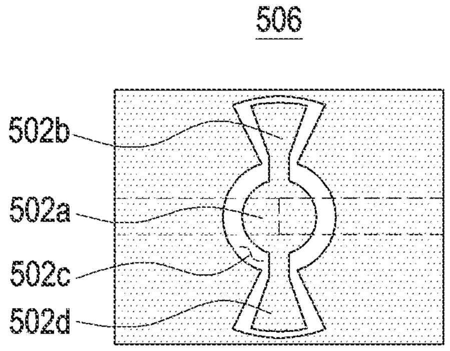
FIG. 11F is a planar view illustrating an open stub structure designed in a network unit of an antenna module according to an embodiment of the disclosure.

FIG. 11F is a planar view illustrating an open stub structure designed in a network unit of an antenna module according to an embodiment of the disclosure.

Figure 11G:
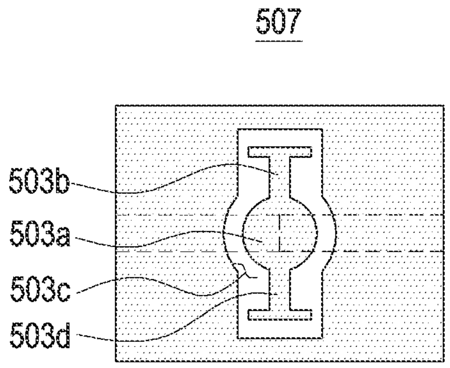
FIG. 11G is a planar view illustrating an open stub structure designed in a network unit of an antenna module according to an embodiment of the disclosure.

FIG. 11G is a planar view illustrating an open stub structure designed in a network unit of an antenna module according to an embodiment of the disclosure.

Figure 11H:
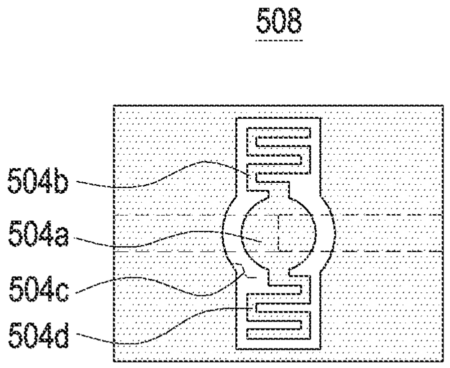
FIG. 11H is a planar view illustrating an open stub structure designed in a network unit of an antenna module according to an embodiment of the disclosure.

FIG. 11H is a planar view illustrating an open stub structure designed in a network unit of an antenna module according to an embodiment of the disclosure.

Figure 12:
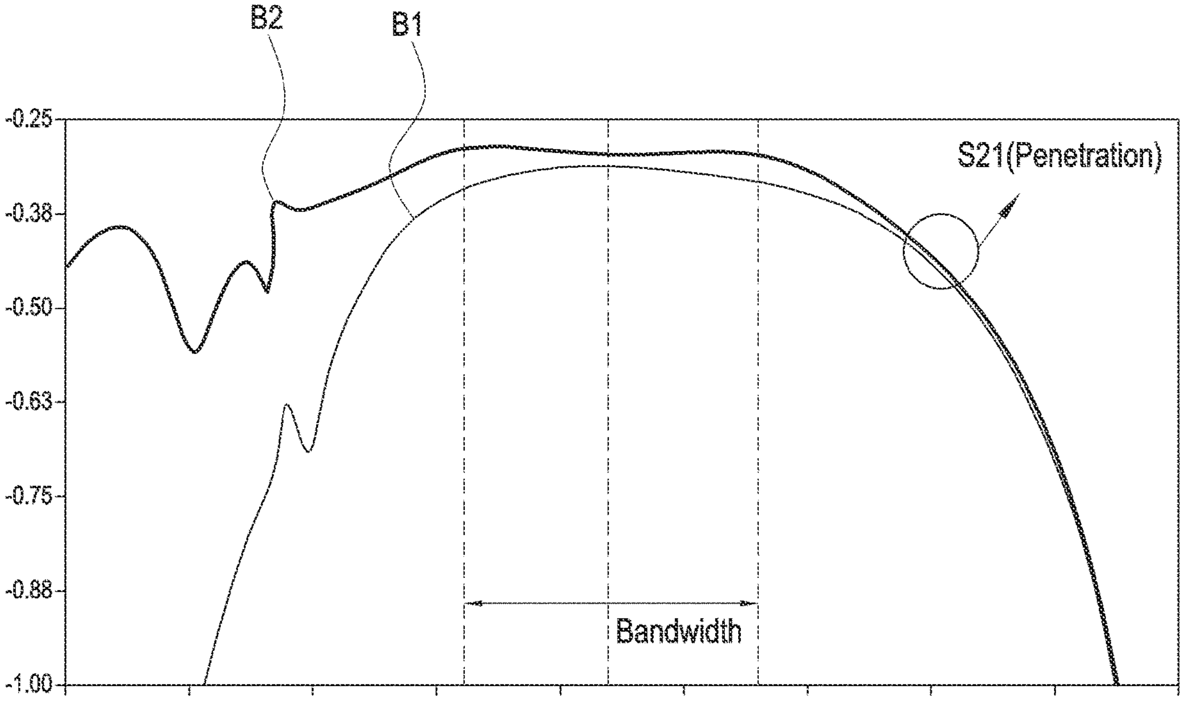
FIG. 12 is a graph depicting an attribute of a transmission line between open stubs when different open stubs are implemented on a network unit of an antenna module according to an embodiment of the disclosure.

FIG. 12 is a graph depicting an attribute of a transmission line between open stubs when different open stubs are implemented on a network unit of an antenna module according to an embodiment of the disclosure.

According to various embodiments, an electronic device (for example, electronic device 101 in FIGS. 1 to 4) may include an antenna module (for example, antenna module 300 in FIG. 5). A network unit 302 of the antenna module 300 may provide an efficient matching design of transmission lines in a narrow space to provide a high frequency. Accordingly, space efficiency may be improved, and line loss may be minimized by optimizing the internal structure of the module.

The open stub structure 500 of the antenna module in FIGS. 11A, 11B, 11C, 11D, 11E, 11F, 11G, and 11H may be partially or entirely identical to the open stub structure 500 of the antenna module in FIGS. 5 to 10.

According to various embodiments, the open stub(s) extending from a via pad in the open stub structure may be designed and changed in various shapes. For example, it is possible to design an antenna to have a stable attribute through a structure including open stubs extending from a via pad in directions different from each other (for example, opposite directions). For another example, a structure including an open stub extending from the via pad only in one direction may be designed to provide space advantage and to have a stable attribute for an antenna corresponding to the structure including bidirectional extending portions according to adjusting the length and thickness thereof.

According to various embodiments, the open stubs of the open stub structure may be designed in various shapes such as bar, radial, T, and meander line shapes and selectively structured on a ground plane through which a via passes so as to match the impedances among transmission lines. According to an embodiment, the open stub structure may be designed on the same layer as the layer providing the ground plane.

Referring to FIG. 11A, an open stub structure 501 may designed to include a via pad 501*a* formed to surround the periphery of a via hole, one open stub 501*b* extending from the via pad 501*a*, and a slot part 501*c* formed to surround the via pad 501*a* and the open stub 501*b*. One of the open stubs 501*b* may have a bar shape.

Referring to FIG. 11B, another open stub structure 502 may designed to include a via pad 502*a* formed to surround the periphery of a via hole, one open stub 502*b* extending from the via pad 502*a*, and a slot part 502*c* formed to surround the via pad 502*a* and the open stub 502*b*. One of the open stubs 502*b* may have a radial shape. For example, the open stub 502*b* may be designed in a radial shape that increases in area outward from the via pad 502*a* to have a structure advantageous for broadband.

Referring to FIG. 11C, still another open stub structure 503 may designed to include a via pad 503*a* formed to surround the periphery of a via hole, one open stub 503*b* extending from the via pad 503*a*, and a slot part 503*c* formed to surround the via pad 503*a* and the open stub 503*b*. One of the open stubs 503*b* may have a T-shape. For example, the open stub 503*b* may be designed to have a structure including a bar extending from the via pad 503*a* and a portion extending from the bar end in a direction perpendicular to the bar.

Referring to FIG. 11D, still another open stub structure 504 may designed to include a via pad 504*a* formed to surround the periphery of a via hole, one open stub 504*b* extending from the via pad 504*a*, and a slot part 504*c* formed to surround the via pad 504*a* and the open stub 504*b*. One of the open stubs 504*b* may have a meander line shape. For example, the open stub 504*b* may be designed in an elongated meandering structure extending outward from the via pad 504*a*.

Referring to FIG. 11E, still another open stub structure 505 may employ the open stub structure 501 in FIG. 11A. The open stub structure 505 in FIG. 11E may be a structure including open stubs 501*b* and 501*d* arranged in opposite directions from the via pad 501*a*, and the two open stubs 501*b* and 501*d* may be designed to face opposite directions and have a bar shape corresponding to each other.

Referring to FIG. 11F, still another open stub structure 506 may employ the open stub structure 502 in FIG. 11B. The open stub structure 506 in FIG. 11F may be a structure including open stubs 502*b* and 502*d* arranged in opposite directions from the via pad 502*a*, and the two open stubs 502*b* and 502*d* may be designed to face opposite directions and have a radial shape corresponding to each other.

Referring to FIG. 11G, still another open stub structure 507 may employ the open stub structure 503 in FIG. 11C. The open stub structure 507 in FIG. 11G may be a structure including open stubs 503*b* and 503*d* arranged in opposite directions from the via pad 503*a*, and the two open stubs 503*b* and 503*d* may be designed to face opposite directions and have a T-shape corresponding to each other.

Referring to FIG. 11H, still another open stub structure 508 may employ the open stub structure 504 in FIG. 11D. The open stub structure 508 in FIG. 11H may be a structure including open stubs 504*b* and 504*d* arranged in opposite directions from the via pad 504*a*, and the two open stubs 504*b* and 504*d* may be designed to face opposite directions and have a meander line shape corresponding to each other.

However, the open stub structure of the antenna module is not limited to the illustrated embodiments and may be designed and changed in various structures to match impedances among the transmission lines.

Referring to FIG. 12, the radial-shaped stub structure such as FIG. 11B or 11F may be designed on the same layer as the layer forming the ground plane in order to achieve the open stub structure advantageous in broadband and the radial-shaped stub structure was confirmed to show improved transmission line performance compared to the bar-shaped stub structure in FIG. 11A or 11E.

In a graph shown in FIG. 12, line 1 B1 shows an attribute of the transmission line in the bar-shaped stub structure and line 2 B2 shows an attribute of the transmission line in the radial-shaped stub structure. Line 1 B1 and line 2 B2 indicate S21 plots.

According to an embodiment, the radial-shaped stub structure was confirmed to show relatively higher permeability in a specific bandwidth compared to the bar-shaped stub structure. However, the attribute of the transmission line in the graph amounts to one example of comparison of transmission line attribute of the bar-shaped stub structure and the radial-shaped stub structure in broadband attributes under the same conditions and the bar-shaped stub structure may show more advantageous transmission line attributes depending on the conditions of surrounding structures.

Figure 13:
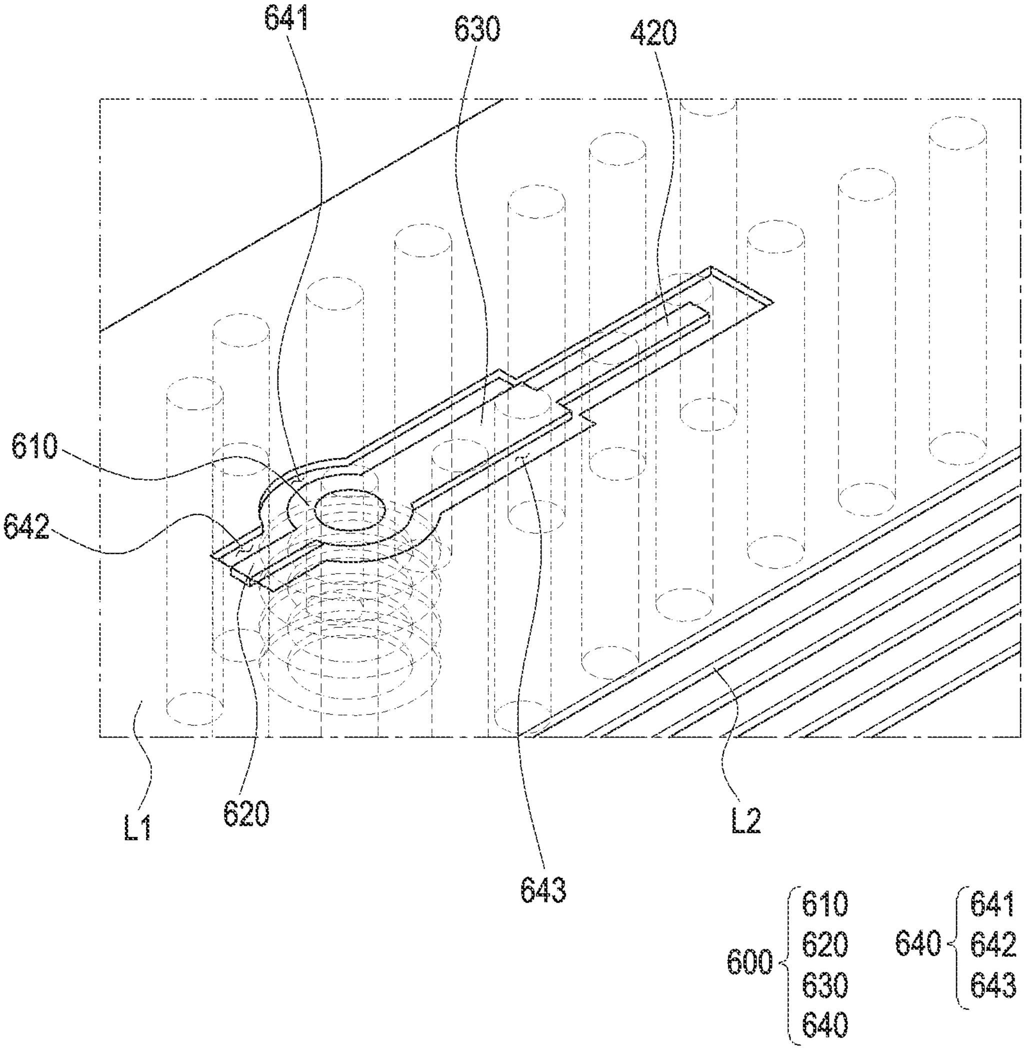
FIG. 13 is a perspective view illustrating a short stub structure designed in a network unit of an antenna module according to an embodiment of the disclosure.
Figure 14:
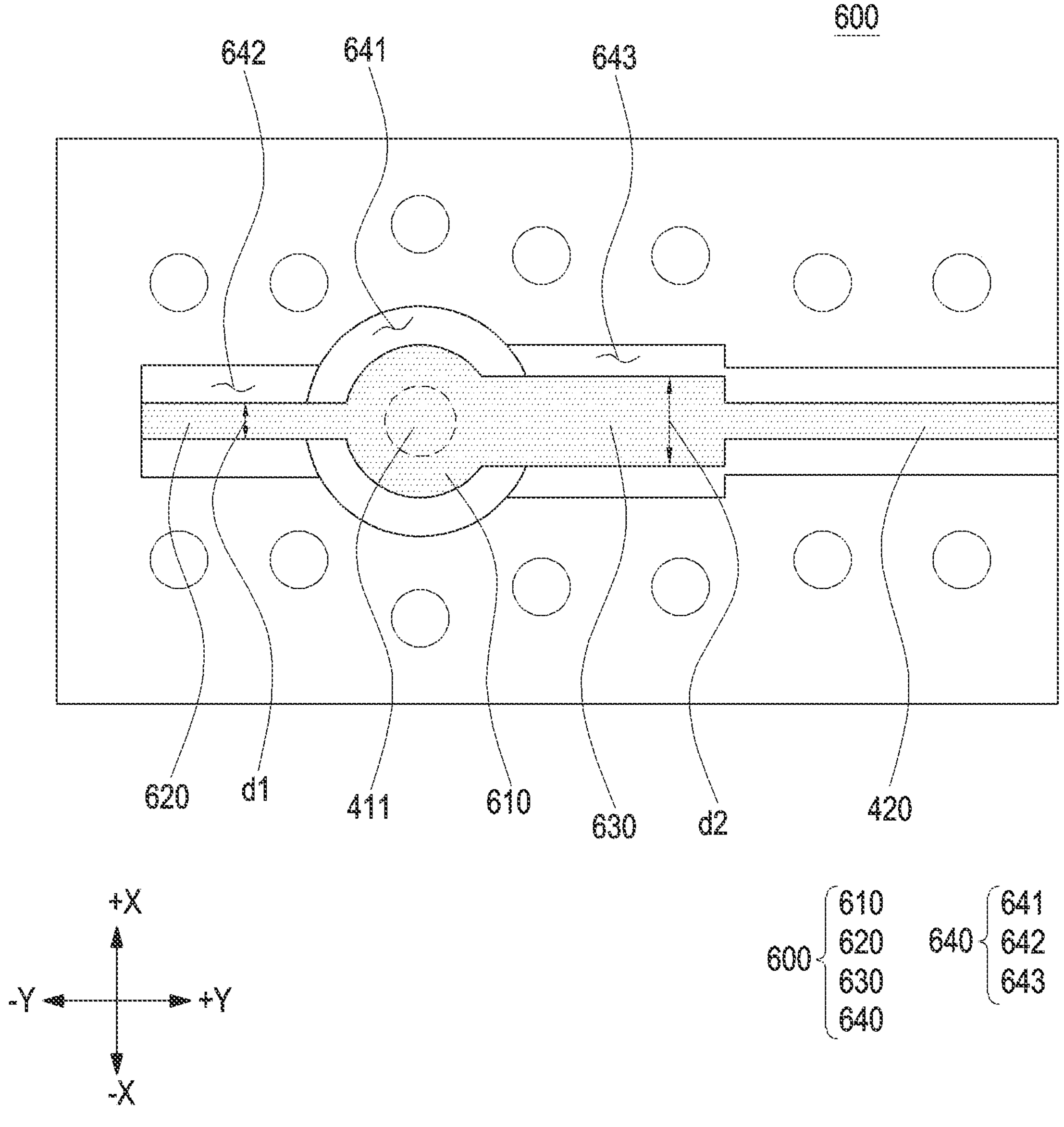
FIG. 14 is a planar view illustrating a short stub structure designed in a network unit of an antenna module according to an embodiment of the disclosure.
Figure 15:
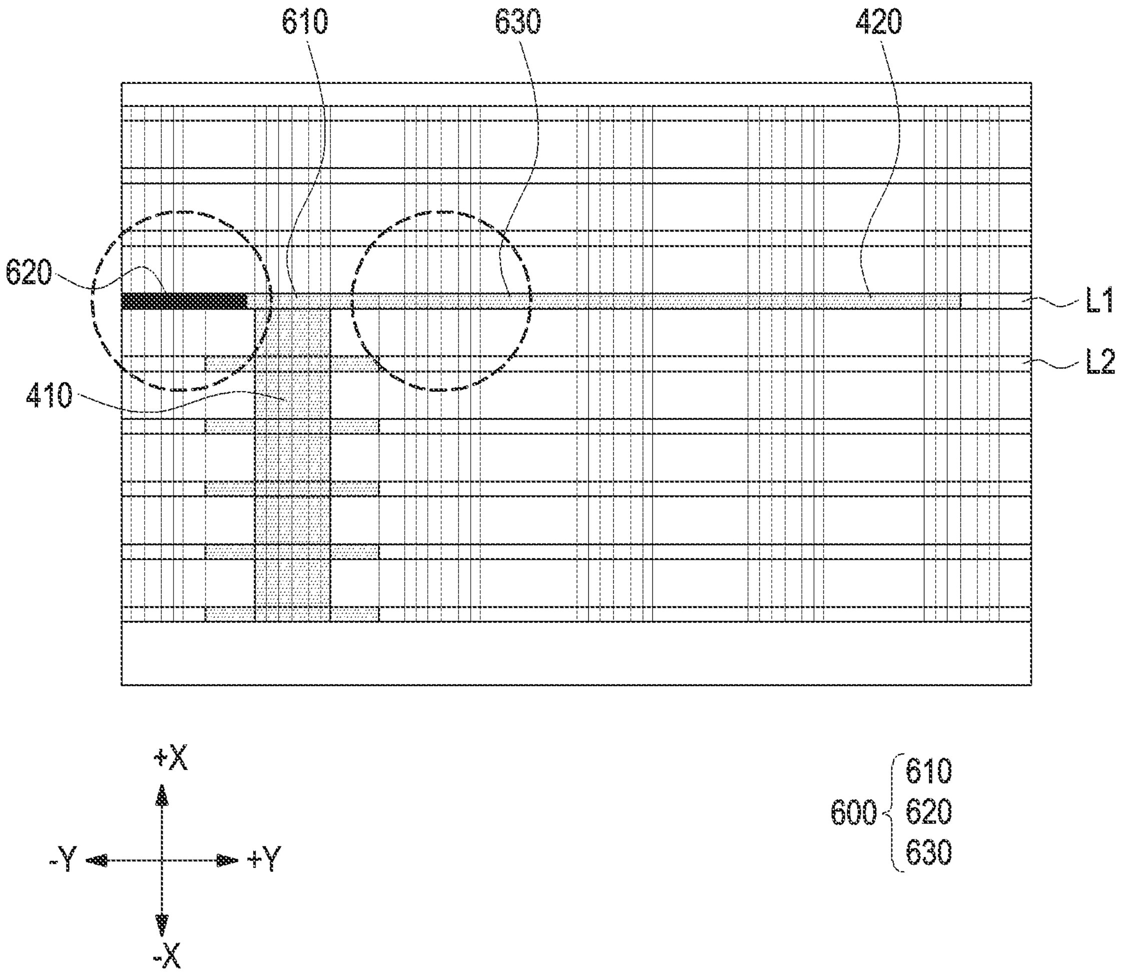
FIG. 15 is a cross-sectional view illustrating a short stub structure designed in a network unit of an antenna module according to an embodiment of the disclosure.

FIG. 13 is a perspective view illustrating a short stub structure designed in a network unit of an antenna module according to an embodiment of the disclosure. FIG. 14 is a planar view illustrating a short stub structure designed in a network unit of an antenna module according to an embodiment of the disclosure. FIG. 15 is a cross-sectional view illustrating a short stub structure designed in a network unit of an antenna module according to an embodiment of the disclosure.

According to various embodiments, an electronic device (for example, electronic device 101 in FIGS. 1 to 4) may include an antenna module (for example, antenna module 300 in FIG. 5). The antenna module 300 may have an antenna in package structure applicable to an ultrahigh frequency, and an antenna disposed on the antenna module 300 may form a subarray. A network unit 302 of the antenna module 300 may provide an efficient matching design of transmission lines in a narrow space to provide a high frequency. Accordingly, space efficiency may be improved, and line loss may be minimized by optimizing the internal structure of the module.

The configuration of the network unit 302 of the antenna module in FIGS. 13 to 15 may be entirely or partially identical to that of the network unit 302 of the antenna module in FIGS. 5 and 6.

According to various embodiments, the network unit 302 of the antenna module 300 may include a feeding network unit (for example, feeding network unit 320 in FIG. 6) and a routing unit (for example, routing unit 330 in FIG. 6) stacking on each other. The feeding network unit 320 and the routing unit 330 may each include multiple layers. A short stub structure 600 may designed in one area of the feeding network unit 320 and/or the routing unit 330. Hereinafter, the short stub structure 600 designed in the routing unit 330 will be described, and the described short stub structure 600 may be equally applied to the feeding network unit 320 as well.

According to various embodiments, the short stub structure 600 may be included in at least one layer of the routing unit 330 and the short stub structure 600 may improve impedance matching performance among the transmission lines in a narrow space. According to an embodiment, the short stub structure 600 may be designed on a first layer L1, a second layer L2 positioned over or under the first layer L1 may include a ground plane, and the second layer L2 may be electrically connected to the first layer L1 through a via 410 (including via hole 411 and via pad 510). For another example, in an area adjacent to the via of the second layer L2, the open stub structure (for example, open stub structure 500 in FIGS. 7 to 9) may be designed to extend in a first direction (+X axis direction) (or second direction (−X axis direction)) from the via.

According to various embodiments, the short stub structure 600 may be formed in the same layer that a transmission line 420 of a strip line is formed on. The transmission line 420 may receive a transmission signal coming up by the via 410 through the short stub structure 600. For example, the short stub structure 600 may include a second via pad 610 formed adjacent to a via hole 411, a short stub 620 extending from the second via pad 610 in a third direction (+Y axis direction), a transformer 630 extending in a direction different from the third direction, and a slot part 640. For another example, the open stub structure 500 may be designed to include an opening formed adjacent to the via hole 411 of one substrate layer in which the transmission line 420 is disposed, a short stub 620 in an area of the second via pad 610, and the transformer 630 formed on a different area and extending along the opening.

According to an embodiment, the second via pad 610 may be formed to surround the periphery of the via hole 411. For example, the second via pad 610 may be provided in a closed loop shape and the slot part 640 may be designed along the periphery of the second via pad 610. In the short stub 620 extending from the second via pad 610 in the third direction (+Y axis direction), an end thereof facing the third direction (+Y axis direction) may be disposed to be in contact with an area of a substrate of the same layer, opposite lateral surfaces formed in a direction (for example, +X, −X axis direction) perpendicular to the third direction (+Y axis direction) may be separated from the substrate by at least a portion (for example, second slot part 642) of the slot part 640. According to an embodiment, one area of the substrate, which is in contact with an end of the short stub 620, may provide a ground plane. According to an embodiment, the short stub 620 may include a conductive material and may be designed in a bar shape disposed parallel to the substrate. The short stub 620 is designed to be in contact with the ground plane providing the same surface as the strip line, and thus may not increase the size of the via and realize impedance matching among transmission lines in a physically narrow space.

According to an embodiment, the transformer 630 extending in a fourth direction (−Y axis direction) opposite to the third direction (+Y axis direction) from the second via pad 610 may be designed to extend to the transmission line 420. The transformer 630 may provide a signal transferred through the via 410 to the transmission line 420 by electrical connection to the transmission line 420. The transformer 630 may be formed to have a thickness different from that of the short stub 620. For example, the short stub 620 may have a width d1 of a first length extending in the first direction (+X axis direction) (or second direction (−X axis direction)) and the transformer 630 may have a width d2 of a second length extending in the first direction (+X axis direction) (or second direction (−X axis direction)). The width d2 of the second length may be designed to be larger than the width d1 of the first length. For another example, the width d2 of the second length may be designed to be two-fold or larger than the width d1 of the first length. According to an embodiment, the transformer 630 may include a conductive material and may be designed in a bar shape disposed parallel to the substrate. The slot part 640 may be formed along an edge of the transformer 630 and at least a portion of an end and opposite lateral sides of the transformer 630 facing the fourth direction (−Y axis direction) may be disposed to be spaced apart from an adjacent substrate. According to an embodiment, the transformer 630 may be designed to have a specified impedance and composed of a single stage to be thin in thickness. Accordingly, impedance matching among transmission lines in a physically narrow space may be achieved.

According to an embodiment, the slot part 640 of the short stub structure 600 may be formed to surround at least a portion of the second via pad 610, the short stub 620, and the transformer 630. For example, the slot part 640 may include a first slot part 641 formed in a closed loop shape to surround the second via pad 610 provided in a ring shape, a second slot part 642 connected to the first slot part 641 and formed to surround the short stub 620, and a third slot part 643 connected to the first slot part 641 and formed to surround the transformer 630. For another example, the slot part 640 may include a first slot part 641 formed in a shape to correspond to the second via pad 610 and separating the second via pad 610 from the substrate area, a second slot part 642 connected to the first slot part 641 and formed along an end and opposite lateral surfaces of the short stub 620, and a third slot part 643 connected to the first slot part 641 and formed along opposite lateral surfaces of the transformer 630.

Figure 16A:
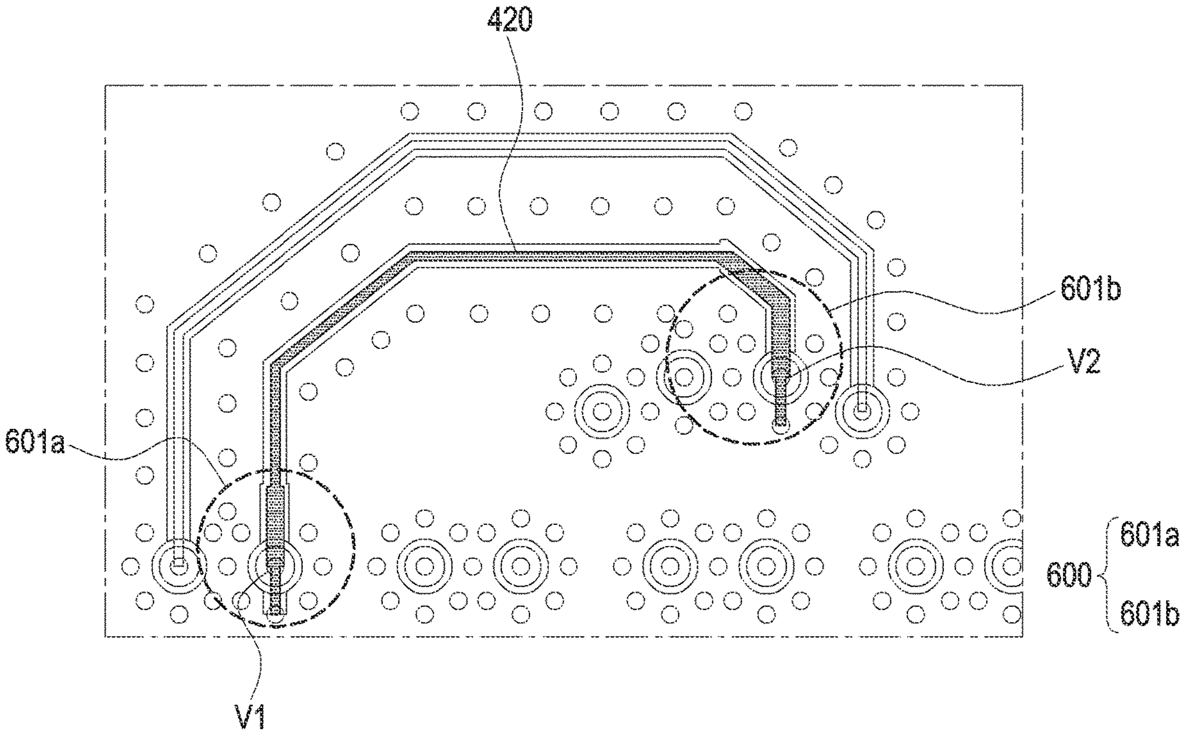
FIG. 16A is a planar view illustrating a short stub structure designed in a network unit of an antenna module according to an embodiment of the disclosure.

FIG. 16A is a planar view illustrating a short stub structure designed in a network unit of an antenna module according to an embodiment of the disclosure.

Figure 16B:
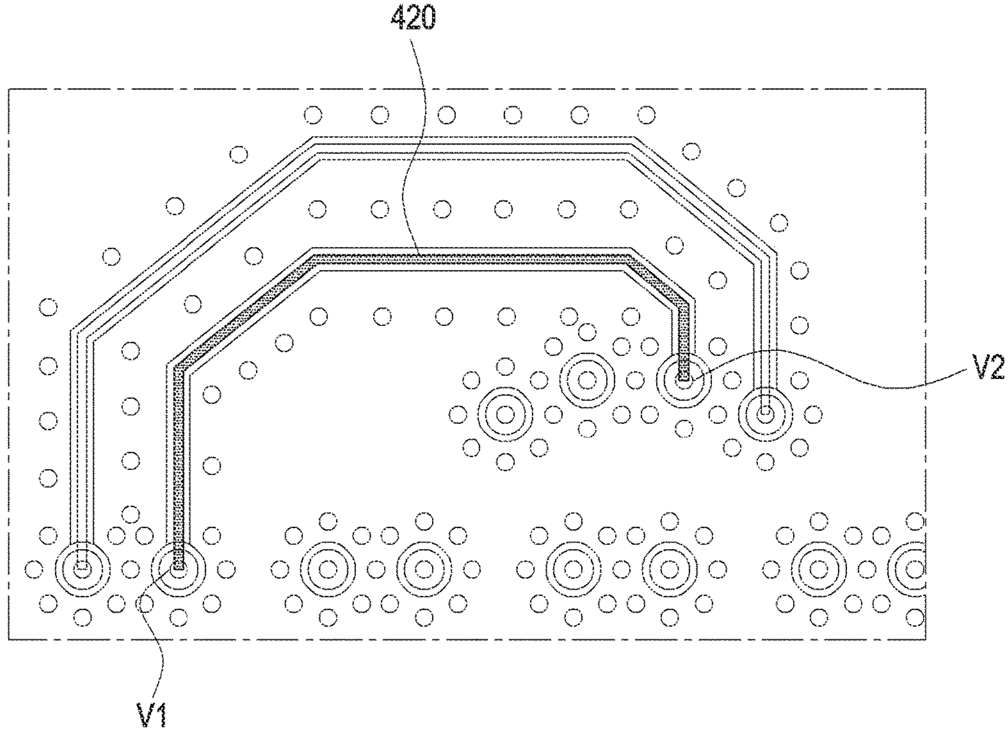
FIG. 16B is a planar view illustrating a transmission line structure from which a short stub structure is excluded for comparison with FIG. 16A according to an embodiment of the disclosure.

FIG. 16B is a planar view illustrating a transmission line structure from which a short stub structure is excluded for comparison with FIG. 16A according to an embodiment of the disclosure.

Figure 17A:
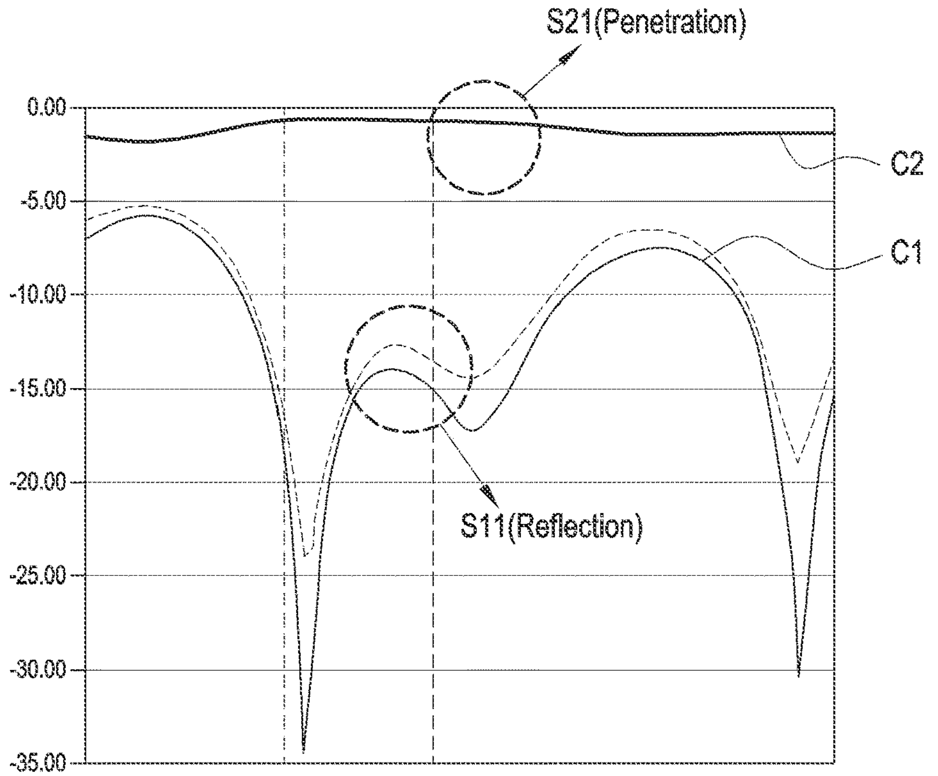
FIG. 17A is a graph depicting an attribute of a transmission line when a short stub structure is designed in a network unit of an antenna module according to an embodiment of the disclosure.

FIG. 17A is a graph depicting an attribute of a transmission line when a short stub structure is designed in a network unit of an antenna module according to an embodiment of the disclosure.

Figure 17B:
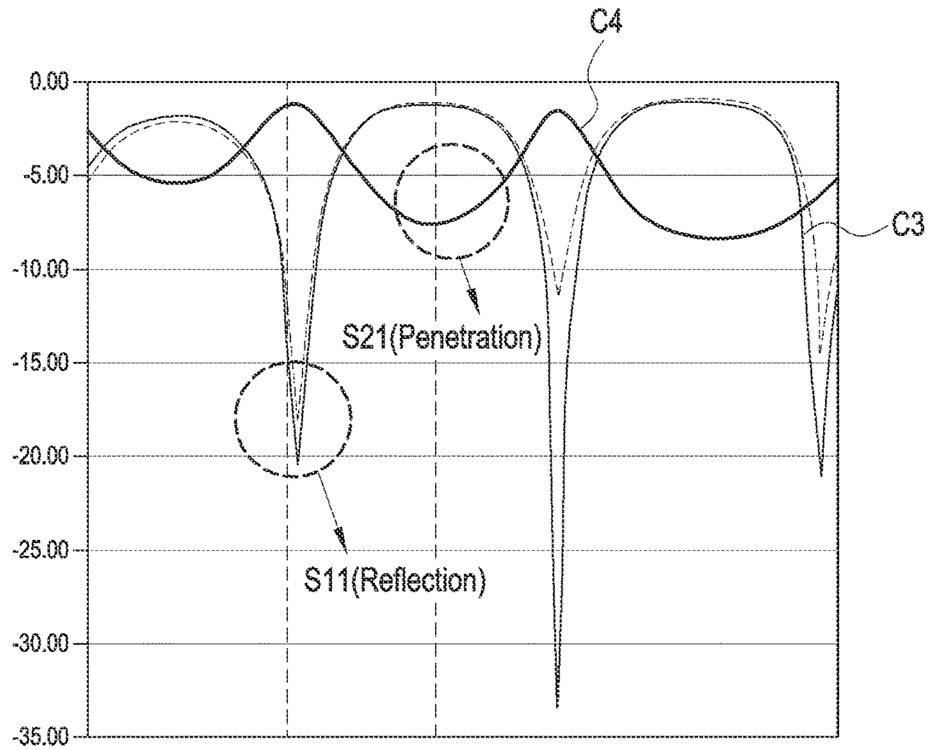
FIG. 17B is a graph depicting an attribute of a transmission line when a short stub structure is excluded for comparison with FIG. 17A according to an embodiment of the disclosure.

FIG. 17B is a graph depicting an attribute of a transmission line structure when a short stub structure is excluded for comparison with FIG. 17A according to an embodiment of the disclosure.

According to various embodiments, in the network unit of the antenna module in which multiple circuit boards are stacked, a transmission line 420 may be designed to be disposed between the first via V1 and a second via V2 configured to transfer a signal. The transmission line 420 may include a bent or curved portion in a path between the first via V1 and the second via V2 due to various components (for example, ground via) on the substrate.

Referring to FIG. 16A, short stub structures 600 may be designed adjacent to each of the first via V1 and the second via V2. For example, a first short stub structure 600*a* may be designed adjacent to the first via V1 and then connected to the first via V1 and one end of the transmission line 420. For another example, a second short stub structure 600*b* may be designed adjacent to the second via V2 and then connected to the second via V2 and other end of the transmission line 420. The first short stub structure 600*a* and the second short stub structure 600*b* shown in FIG. 16A may be partially or entirely identical to the short stub structure 600 in FIGS. 13 to 15.

FIG. 16B, unlike FIG. 16A, shows a structure without the first short stub structure 600*a* and/or the second short stub structure 600*b* and simply having the transmission line 420 disposed between the first via V1 and the second via V2.

FIG. 17A shows a graph depicting an attribute of the transmission line 420 with the short stub structure 600 such as the structure shown in FIG. 16A, and FIG. 17B shows a graph depicting an attribute of the transmission line 420 without the short stub structure such as the structure shown in FIG. 16B.

Referring to FIG. 17A, according to an embodiment, line 1 C1 and line 2 C2 show an attribute of the transmission line when the short stub structure 600 is designed, and referring to FIG. 17B, line 3 C3 and line 4 C4 show an attribute of the transmission line when the short stub structure is absent. Line 1 C1 and line 3 C3 are S11 plots and line 2 C2 and line 4 C4 are S21 plots.

The comparison of the case of including the short stub structure 600 (for example, line 1 C1) according to an embodiment with the case of excluding the short stub structure (for example, line 3 C3) confirmed that the case of including the open stub structure has relatively reduced reflectivity in a specific band width. The comparison of the case of including the short stub structure 600 (for example, line 2 C2) according to an embodiment with the case of excluding the short stub structure (for example, line 4 C4) confirmed that the case of including the short stub structure has relatively high permeability in a specific bandwidth.

Figure 18A:
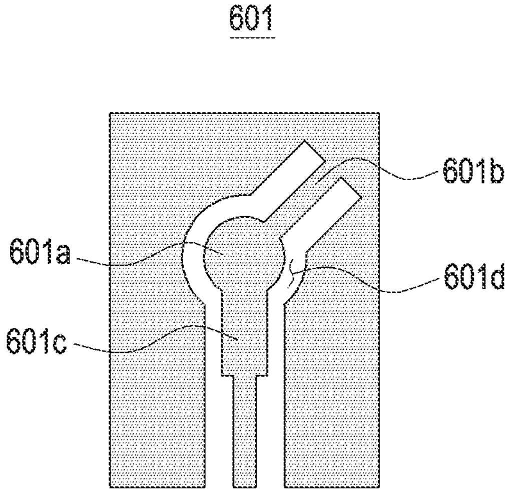
FIG. 18A is a planar view illustrating a short stub structure designed in a network unit of an antenna module according to an embodiment of the disclosure.

FIG. 18A is a planar view illustrating a short stub structure designed in a network unit of an antenna module according to an embodiment of the disclosure.

Figure 18B:
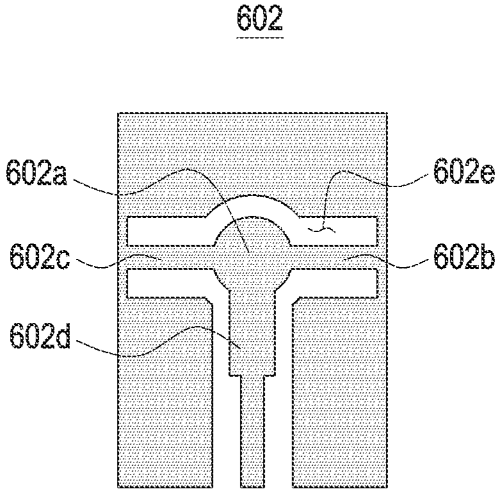
FIG. 18B is a planar view illustrating a short stub structure designed in a network unit of an antenna module according to an embodiment of the disclosure.

FIG. 18B is a planar view illustrating a short stub structure designed in a network unit of an antenna module according to an embodiment of the disclosure.

A network unit (for example, network unit 302 in FIG. 5) constituting an antenna module 300 may provide an efficient matching design of transmission lines in a narrow space to provide a high frequency. Accordingly, space efficiency may be improved, and line loss may be minimized by optimizing the internal structure of the module.

The short stub structure 601 and 602 of the antenna module in FIGS. 18A and 18B may be partially or entirely identical to the short stub structure 600 of the antenna module in FIGS. 13 to 15.

According to various embodiments, the short stub extending from a via pad in the open stub structure and the transformer may be designed and changed in various shapes. The structure and shape of the short stub may be affected by performance and sufficiency of a physical space. For example, in designing the short stub structure, a slot may be added in a direction to an available space near the via configured to transfer a signal so as to secure a space and then the short stub is grounded (shorting) to one area of a substrate. For another example, in addition to the structure facing from a via to a strip line (for example, via to strip line), the design of the short stub structure may be reversely changed to a structure facing from a strip line to a via (for example, strip line to via).

Referring to FIG. 18A, one open stub structure 601 may be designed to include a via pad 601*a* formed to surround the periphery of a via hole, a short stub 601*b* extending from the via pad 601*a* in a third direction, a transformer 601*c* extending in a fourth direction different from the third direction, and a slot part 601*d* formed to surround the via pad 601*a*, the short stub 601*b*, and the transformer 601*c*. The third direction and the fourth direction may be defined and designed to be at a specified angel, for example, more than 90 degrees and less than 180 degrees.

Referring to FIG. 18B, one open stub structure 602 may be designed to include a via pad 602*a* formed to surround the periphery of a via hole, a first short stub 602*b* extending from the via pad 602*a* in a third direction, a second short stub 602*c* extending from the via pad 602*a* in a fourth direction different from the third direction, a transformer 602*d* extending from the via pad 602*a* in a fifth direction different from the third and fourth directions, and a slot part 602*e* formed to surround the via pad 602*a*, the first short stub 602*b*, the second short stub 602*c*, and the transformer 602*d*. The third direction and the fourth direction may be opposite to each other, and the fifth direction may be perpendicular to the third direction (or fourth direction).

Figure 19:
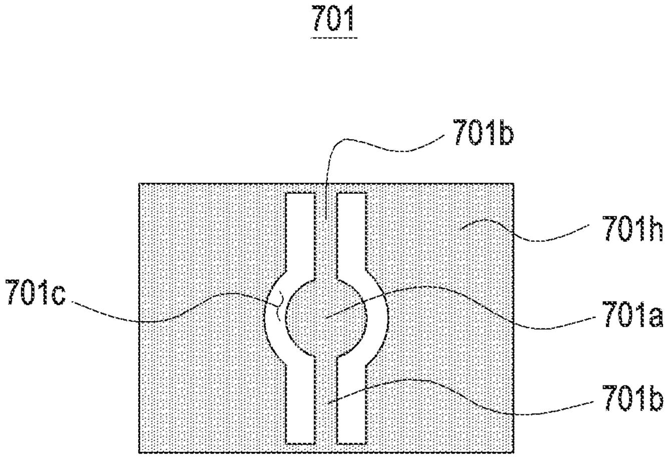
FIG. 19 is a planar view illustrating a short stub structure designed in a network unit of an antenna module according to an embodiment of the disclosure.

FIG. 19 is a planar view illustrating a short stub structure designed in a network unit of an antenna module according to an embodiment of the disclosure.

Figure 20:
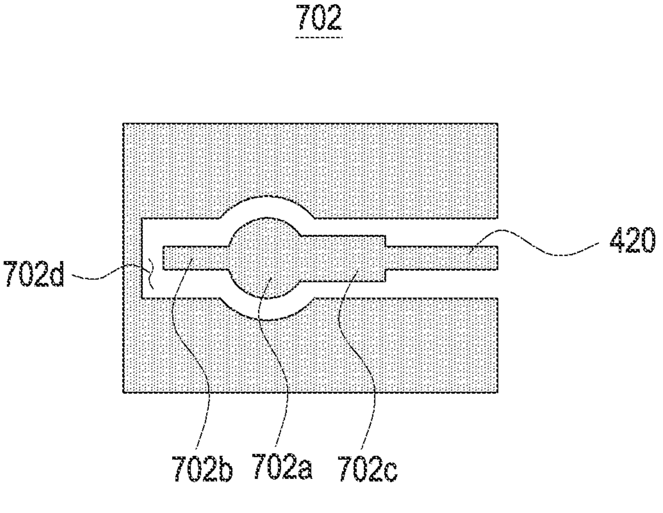
FIG. 20 is a planar view illustrating an open stub structure designed in a network unit of an antenna module according to an embodiment of the disclosure.

FIG. 20 is a planar view illustrating an open stub structure designed in a network unit of an antenna module according to an embodiment of the disclosure.

According to various embodiments, the antenna module may include, as antenna elements forming a subarray, transmission lines branched on multiple stacked substrates to transmit and/or receive a signal. In an embodiment, impedance mismatch may occur at a transition point of the transmission structure of the multiple stacked substrates, and in order to solve the mismatch, an open stub structure and a short stub structure may be selectively designed at the transition point. For example, as described above, one of the open stub structure or the short stub structure may be selected and matched or both of the structures (for example, open stub structure and short stub structure) may be selected and matched.

The short stub structure 701 and the open stub structure 702 in FIGS. 19 and 20 may partially or entirely identical to the open stub structure 500 in FIGS. 7 to 9 and the short stub structure 600 in FIGS. 13 to 15.

Referring to FIG. 19, the short stub structure 600 similar to the open stub structure 500 in FIGS. 7 to 9 may be designed. Obtainable impedance-reactance varies according to stub types, and therefore, in a structure in which the mismatch can be solved, the short stub structure 701 may be designed in the same layer as the ground plane through which the via passes. For example, the short stub structure 701 may include a via pad 701*a* formed adjacent to a via hole, a short stub 701*b* extending from the via pad 701*a*, and a slot part 701*c*. Multiple short stubs 701*b* may extend from the via pad 701*a* and disposed to be in contact with a substrate 701*h* forming a ground plane.

Referring to FIG. 20, an open stub structure 702 similar to the short stub structure 600 in FIGS. 13 to 15 may be designed. Obtainable impedance-reactance varies according to stub types, and therefore, in a structure in which the mismatch can be solved, the open stub structure 702 may be designed in the same layer on which the transmission line 420 is disposed so as to be connected to the transmission line 420. For example, the open stub structure 702 may include a via pad 702*a* formed adjacent to a via hole, an open stub 702*b* extending from the via pad 702*a* and spaced apart from a substrate, a transformer 702*c* facing a direction opposite to the open stub 702*b* and connected to the transmission line 420, and a slot part 702*d*.

Figure 21:
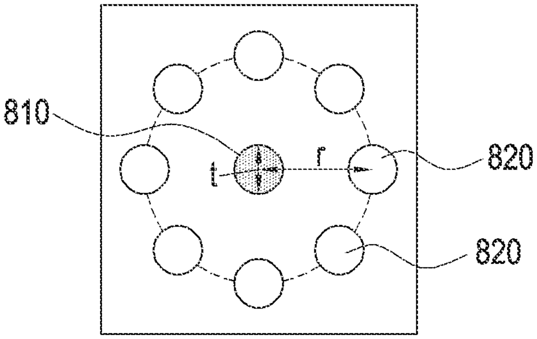
FIG. 21 is a view illustrating an arrange relationship of vias and transmission lines of a strip line designed in a network unit of an antenna module according to an embodiment of the disclosure.
Figure 22:
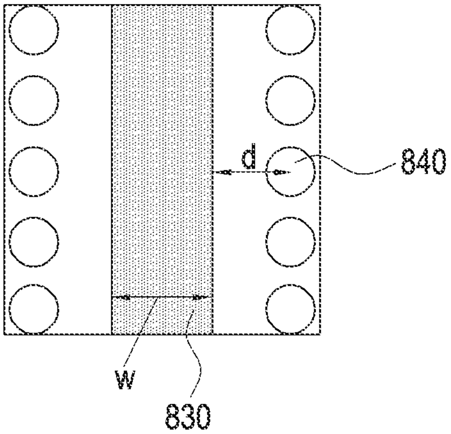
FIG. 22 is a view illustrating an arrange relationship of vias and transmission lines of a strip line designed in a network unit of an antenna module according to an embodiment of the disclosure.

FIG. 21 is a view illustrating an arrange relationship of vias and transmission lines of a strip line designed in a network unit of an antenna module according to an embodiment of the disclosure. FIG. 22 is a view illustrating an arrange relationship of vias and transmission lines of a strip line designed in a network unit of an antenna module according to an embodiment of the disclosure.

According to various embodiments, the antenna module may include, as antenna elements forming a subarray, transmission lines branched on multiple stacked substrates to transmit and/or receive a signal. In an embodiment, impedance mismatch may occur at a transition point of the transmission structure of the multiple stacked substrates, and in order to solve the mismatch, an open stub structure and/or a short stub structure may be selectively designed at the transition point. The stub structure and/or the short stub structure may be affected by the impedance of the via and the transmission line of the strip line formed on the network unit. Hereinafter, a parameter determining the impedance of the via and the transmission line of the strip line will be described.

Referring to FIG. 21, in one area of a substrate, a via (hereinafter, referred to as vertical transmission line 810) configured to transmit and/or receive a signal may be designed to be spaced apart from multiple ground vias (820) on the peripheral area. According to an embodiment, the impedance of the vertical transmission line 810 may be controlled to have an advantageous value in design rather than a specific value by adjusting a diameter t of the vertical transmission line 810 and a distance r from the center of the vertical transmission line 810 to the center of the ground via 820.

Referring to FIG. 22, in another area of the substrate, a transmission line (hereinafter, referred to as horizontal transmission line 830) of a strip line, configured to transmit and/or receive a signal may be designed to have multiple ground vias 840 arranged at opposite lateral sides of the horizontal transmission line 830 while being spaced apart from each other. According to an embodiment, the impedance of the horizontal transmission line 830 may be controlled to have an advantageous value in design rather than a specific value by adjusting a line thickness W of the horizontal transmission line 830 and a distance d from the center of the horizontal transmission line 830 to the center of the ground via 840.

According to various embodiments, the transition portion of the vertical transmission line 810 and the horizontal transmission line 830 may achieve the impedance match between the transition portion of the vertical transmission line 810 and the horizontal transmission line 830 while utilizing a minimum space in a multi-substrate structure by applying the open stub structure and/or the short stub structure described above.

An antenna module (for example, antenna module 300 in FIGS. 5 and 6) according to various embodiments may include a communication circuit (for example, communication circuit 341 in FIG. 5), an antenna part (for example, antenna unit 301 in FIG. 5) including multiple antenna elements constituting a subarray, and a network part (for example, network unit 302 in FIG. 5) disposed beneath the antenna part in multiple layers, the network part including at least one transmission line configured to be branched to positions of the multiple antenna elements, a via hole extending through the multiple layers, and a stub structure disposed adjacent to the via hole. The open stub structure (for example, open stub structure 500 in FIG. 6) designed on a first layer, among the multiple layers, forming a ground plane may include a first via pad (for example, first via pad 510 in FIG. 7) disposed adjacent to the via hole, a first open stub (for example, first open stub 521 in FIG. 7) extending from the first via pad in a first direction, and a first slot part (for example, slot part 530 in FIG. 7) configured to surround an edge of the first via pad and the first open stub. The short stub structure (for example, short stub structure 600 in FIG. 6) designed on a second layer different from the first layer may include a second via pad (for example, second via pad 610 in FIG. 13) disposed adjacent to the via hole, a short stub (for example, short stub 620 in FIG. 13) extending from the second via pad in a second direction, a transformer (for example, transformer 630 in FIG. 13) extending from the second via pad in a third direction different from the second direction so as to be connected to the at least one transmission line, and a second slot part (for example, slot part 640 in FIG. 13) configured to surround at least a portion of an edge of the second via pad, the short stub, and the transformer.

According to various embodiments, the open stub structure may further include a second open stub (for example, second open stub 522 in FIG. 7) extending from the first via pad in a fourth direction different from the first direction.

According to various embodiments, in the open stub structure, the first direction and the fourth direction may be opposite to each other.

According to various embodiments, in the open stub structure, the first via pad may be provided in a closed loop shape to surround a periphery of the via hole, and the first open stub or the second open stub may be disposed to be spaced apart from the ground plane.

According to various embodiments, the slot part may include a (1-1)th slot part (for example, first slot part 531 in FIG. 7) provided in a shape corresponding to the first via pad and configured to separate the first via pad from a ground plane, a (1-2)th slot part (for example, second slot part 532 in FIG. 7) connected to the (1-1)th slot and formed along an end and opposite lateral surfaces of the first open stub, and a (1-3)th slot part (for example, third slot part 533 in FIG. 7) connected to the (1-1)th slot part and formed along an end and opposite lateral surfaces of the second open stub.

According to various embodiments, the first open stub and/or the second open stub may be designed in at least one of a bar shape, a radial shape, a T-shape, and a meander line shape.

According to various embodiments, in the short stub structure, the second via pad may be provided in a closed loop shape to surround a periphery of the via hole, and the short stub may be disposed to be in contact with an area of the substrate of the second layer.

According to various embodiments, in the short stub structure, the second direction and the third direction may be opposite to each other.

According to various embodiments, the first direction in which the first open stub of the open stub structure extends and the second direction in which the short stub of the short stub structure extends may be perpendicular to each other.

According to various embodiments, the second slot part may include a (2-1)th slot part (for example, first slot part 641 in FIG. 13) provided in a shape corresponding to the second via pad and configured to separate the second via pad from an adjacent substrate, a (2-2)th slot part (for example, second slot part 642 in FIG. 13) connected to the (2-1)th slot part and formed along opposite lateral surfaces of the short stub, and a (2-3)th slot part (for example, third slot part 643 in FIG. 13) connected to the (2-1)th slot and formed along opposite lateral surfaces of the transformer.

According to various embodiments, it is possible to design that the transformer has a width of a first length in a direction perpendicular to the extension direction, the short stub has a width of second length in a direction perpendicular to the extension direction, and the width of the first length is designed to be larger than the width of the second length.

According to various embodiments, one area of the substrate, which is in contact with an end of the short stub, may provide a ground plane.

According to various embodiments, the network part may include a feeding network part 320 disposed beneath the antenna part and including a first transmission via and a first transmission line branched into positions of the multiple antenna elements so that the multiple antenna elements form the same phase, and a routing part disposed between the feeding network part and the communication circuit and including a second transmission via and a second transmission line extending from a position corresponding to an output terminal of the communication circuit toward a position corresponding to an input terminal of the feeding network part on at least one layer.

According to various embodiments, the open stub structure or the short stub structure may be designed in a transition area between the first transmission line and the first transmission via of the feeding network part, or designed in a transition area between the second transmission line and the second transmission via of the routing part.

An antenna module according to various embodiments of the disclosure may include a communication circuit, an antenna part including multiple antenna elements constituting a subarray, and a network part including multiple substrates stacked between the communication circuit and the antenna part, wherein an open stub structure is designed on at least one layer, among the multiple substrates, configured to form a ground plane. The open stub structure may include a first via pad formed along an edge of a via hole, a first open stub extending from the first via pad in a first direction, and a first slot part formed to surround an edge of the first via pad and the first open stub so as to separate the first via pad and the first open stub from the ground plane.

According to various embodiments, the open stub structure may further include a second open stub extending from the first via pad in a direction different from the first direction.

According to various embodiments, the short stub structure designed on a layer different from the layer having the open stub structure designed thereon may include a second via pad disposed to be adjacent to the via hole, a short stub extending from the second via pad in a second direction perpendicular to the first direction, a transformer extending from the second via pad in a third direction different from the second direction so as to be connected to the at least one transmission line, and a second slot part configured to surround at least a portion of an edge of the second via pad, the short stub, and the transformer.

An antenna module according to various embodiments of the disclosure may include a communication circuit, an antenna part including multiple antenna elements constituting a subarray, and a network part including multiple substrates stacked between the communication circuit and the antenna part, wherein a short stub structure is designed on at least one layer, among the multiple substrates, having a transmission line of a strip line disposed thereon. The short stub structure may include a first via pad formed along an edge of a via hole, a short stub extending from the first via pad in a first direction, a transformer extending from the first via pad in a second direction different from the first direction so as to be connected to the transmission line of the strip line, and a first slot part configured to surround at least a portion of an edge of the first via pad, the short stub, and the transformer.

According to various embodiments, the second direction and the third direction may be opposite to each other.

According to various embodiments, it is possible to design that the transformer has a width of a first length in a direction perpendicular to the extension direction, the short stub has a width of second length in a direction perpendicular to the extension direction, and the width of the first length is larger than the width of the second length.

It may be apparent to a person ordinarily skilled in the technical field to which the disclosure belongs that an antenna module according to various embodiments of the disclosure and an electronic device including the same are not limited by the above-described embodiments and drawings, and can be variously substituted, modified, and changed within the technical scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An antenna module comprising:

a communication circuit;

an antenna part comprising multiple antenna elements; and a network part disposed beneath the antenna part in multiple layers, the network part comprising at least one transmission line configured to be branched to positions of the multiple antenna elements, a via hole extending through the multiple layers, and a stub structure disposed in an area adjacent to the via hole, wherein an open stub structure forming on a first layer among the multiple layers comprises:

a first via pad disposed to surround the via hole, a first open stub extending from the first via pad in a first direction, and a second open stub extending from the first via pad in a direction opposite to the first direction, and wherein a short stub structure forming on a second layer different from the first layer comprises:

a second via pad disposed to surround at least a portion of the via hole, a short stub extending from the second via pad in a second direction, and a transformer extending from the second via pad in a direction opposite to the second direction and connected to the at least one transmission line, and having a width different from a width of the short stub.

2. The antenna module of claim 1, wherein in the open stub structure, the first via pad is provided in a closed loop shape to surround a periphery of the via hole, and wherein the first open stub or the second open stub is disposed to be spaced apart from a ground plane.

3. The antenna module of claim 1, wherein the open stub structure further comprises a first slot part formed to surround an edge of the first via pad and the first open stub.

4. The antenna module of claim 3, wherein the first slot part comprises:

a (1-1)th slot part provided in a shape corresponding to the first via pad and configured to separate the first via pad from a ground plane;

a (1-2)th slot part connected to the (1-1)th slot part and formed along an end and opposite lateral surfaces of the first open stub; and a (1-3)th slot part connected to the (1-1)th slot and formed along an end and opposite lateral surfaces of the second open stub.

5. The antenna module of claim 1, wherein at least one of the first open stub or the second open stub is designed in at least one of a bar shape, a radial shape, a T-shape, or a meander line shape.

6. The antenna module of claim 1, wherein in the short stub structure, the second via pad is provided in a closed loop shape to surround a periphery of the via hole, and wherein the short stub is disposed to be in contact with an area of a substrate of the second layer.

7. The antenna module of claim 1, wherein the short stub structure further comprises a second slot part formed to surround at least a portion of an edge of the second via pad, the short stub, and the transformer.

8. The antenna module of claim 7, wherein the second slot part comprises:

a (2-1)th slot part provided in a shape corresponding to the second via pad and configured to separate the second via pad from an adjacent substrate;

a (2-2)th slot part connected to the (2-1)th slot part and formed along opposite lateral surfaces of the short stub; and a (2-3)th slot part connected to the (2-1)th slot and formed along opposite lateral surfaces of the transformer.

9. The antenna module of claim 1, wherein the first direction in which the first open stub of the open stub structure extends and the second direction in which the short stub of the short stub structure extends are perpendicular to each other.

10. The antenna module of claim 1, wherein the transformer has a width of a first length in a direction perpendicular to an extension direction, wherein the short stub has a width of a second length in a direction perpendicular to the extension direction, and wherein the width of the first length is larger than the width of the second length.

11. The antenna module of claim 1, wherein an area of a substrate in contact with an end of the short stub provides a ground plane.

12. The antenna module of claim 1, wherein the network part further comprises:

a feeding network part disposed beneath the antenna and comprising a first transmission via and a first transmission line branched into positions of the multiple antenna elements so that the multiple antenna elements form the same phase.

13. The antenna module of claim 12, wherein the network part further comprises:

a routing part disposed between the feeding network part and the communication circuit and comprising a second transmission via and a second transmission line extending from a position corresponding to an output terminal of the communication circuit toward a position corresponding to an input terminal of the feeding network part on at least one layer.

14. The antenna module of claim 13, wherein the open stub structure or the short stub structure is formed in a transition area between the first transmission line and the first transmission via of the feeding network part.

15. The antenna module of claim 13, wherein the open stub structure or the short stub structure is formed in a transition area between the second transmission line and the second transmission via of the routing part.

* * * * *